United States Patent
Gandhi et al.

(10) Patent No.: US 10,040,331 B2
(45) Date of Patent: Aug. 7, 2018

(54) RIDE HEIGHT LEVELING WITH SELECTABLE CONFIGURATIONS SYSTEM AND METHOD

(71) Applicant: Barksdale Inc., Los Angeles, CA (US)

(72) Inventors: Jinesh Gandhi, Torrance, CA (US); Angel Ching, Montebello, CA (US)

( * ) Notice: Subject to any disclaimer, the term of this patent is extended or adjusted under 35 U.S.C. 154(b) by 0 days.

(21) Appl. No.: 15/242,443

(22) Filed: Aug. 19, 2016

(65) Prior Publication Data

US 2017/0282672 A1  Oct. 5, 2017

Related U.S. Application Data

(63) Continuation of application No. 15/090,558, filed on Apr. 4, 2016.

(51) Int. Cl.
| | | |
|---|---|---|
| *B60G 17/052* | (2006.01) | |
| *F16K 31/60* | (2006.01) | |
| *F16K 11/074* | (2006.01) | |
| *B60G 17/015* | (2006.01) | |

(52) U.S. Cl.
CPC ..... *B60G 17/0525* (2013.01); *B60G 17/0155* (2013.01); *F16K 11/074* (2013.01); *F16K 31/602* (2013.01); *B60G 2500/30* (2013.01)

(58) Field of Classification Search
CPC ............ B60G 17/0525; B60G 17/0565; B60G 17/0155; B60G 2202/152; B60G 2202/1522; B60G 9/02; B60G 11/27; B60G 2500/30; B60G 2500/202; B60G 2500/2021; B60G 2500/2022; B62D 24/04; F16K 11/074; F16K 31/602

See application file for complete search history.

(56) References Cited

U.S. PATENT DOCUMENTS

| | | |
|---|---|---|
| 14,999 A | 6/1856 | Burdon |
| 253,166 A | 1/1882 | Hooker |
| 299,004 A | 4/1884 | Pearson |
| 749,990 A | 1/1904 | Holinger |
| 1,036,558 A | 1/1912 | Butz |
| 1,136,589 A | 4/1915 | Davis |
| 1,519,670 A | 12/1924 | Danstrup |
| 2,042,186 A | 5/1936 | Peterson |
| 2,061,716 A | 11/1936 | Pratt et al. |
| 2,146,983 A | 2/1939 | Pick |
| 2,189,094 A | 2/1940 | Weaver |

(Continued)

*Primary Examiner* — Laura Freedman
(74) *Attorney, Agent, or Firm* — Lawrence S. Cohen

(57) ABSTRACT

Disclosed is a configurable dynamic valve. In various embodiments the valve operates to control a pneumatic leveling system for vehicles and provide the capability for an operator to select an elevated or lowered ride height, to block air flow in and out of the leveling air bags, or to dump air from the air bags controlling the ride height. In various embodiments, the valve utilizes rotary disks which contain actuate apertures, wherein the disks form seals between ports which connect various inlet and outlet chambers such that the pneumatically selected operative disk apertures and ports provide air flow in or out of leveling air bags dynamically at a selected ride height during varying load and road conditions. In various embodiments, the modular design of the valve components allows for an easily configurable valve which may be customized to a particular application with a minimum of effort and manufacturing cost.

20 Claims, 23 Drawing Sheets

(56) References Cited

U.S. PATENT DOCUMENTS

| | | | |
|---|---|---|---|
| 2,564,444 | A | 8/1951 | Parsons |
| 2,564,445 | A | 8/1951 | Parsons |
| 2,790,650 | A | 4/1957 | Boschi |
| 2,843,396 | A | 7/1958 | Lucien |
| 2,888,272 | A | 5/1959 | Fletcher |
| 2,896,965 | A | 7/1959 | Moustakis |
| 2,905,430 | A | 9/1959 | Deist |
| 2,910,305 | A | 10/1959 | Marette et al. |
| 2,916,284 | A * | 12/1959 | Bertsch ............ B60G 17/0525 137/596 |
| 2,930,628 | A * | 3/1960 | Bertsch ............ B60G 17/0525 137/635 |
| 2,947,322 | A | 8/1960 | Christensen |
| 2,947,532 | A | 8/1960 | Christensen |
| 2,948,549 | A | 8/1960 | Schultz |
| 2,954,987 | A | 10/1960 | Whelan |
| 2,959,426 | A | 11/1960 | Augustin |
| 2,962,297 | A | 11/1960 | Cislo |
| 2,970,614 | A | 2/1961 | Christensen |
| 2,998,243 | A | 8/1961 | Schultz |
| 3,006,657 | A | 10/1961 | Augustin |
| 3,014,499 | A | 12/1961 | Barksdale |
| 3,099,461 | A | 7/1963 | Stelzer |
| 3,104,114 | A | 9/1963 | Vogel |
| 3,207,871 | A | 9/1965 | Dally |
| 3,214,185 | A | 10/1965 | Mason et al. |
| 3,276,476 | A | 10/1966 | Jackson |
| 3,319,531 | A | 5/1967 | Sanders |
| 3,444,890 | A | 5/1969 | Ralston |
| 3,477,739 | A | 11/1969 | White |
| 3,561,479 | A | 2/1971 | Archer |
| 3,651,555 | A | 3/1972 | Kataoka |
| 3,720,425 | A | 3/1973 | Asano et al. |
| 3,796,232 | A | 3/1974 | Dalton |
| 3,831,968 | A | 8/1974 | Shaffer |
| 3,933,368 | A | 1/1976 | Kellet |
| 4,033,608 | A | 7/1977 | Sweet |
| 4,049,019 | A | 9/1977 | McClocklin |
| 4,065,982 | A | 1/1978 | Wenger |
| 4,076,275 | A | 2/1978 | Hiruma |
| 4,186,773 | A | 2/1980 | Flynn |
| 4,335,901 | A | 6/1982 | Gladish |
| 4,361,346 | A | 11/1982 | Harris |
| 4,377,299 | A | 3/1983 | Fujii |
| 4,468,050 | A | 8/1984 | Woods et al. |
| 4,471,805 | A | 9/1984 | Solie et al. |
| 4,488,576 | A | 12/1984 | Skelly |
| 4,570,972 | A | 2/1986 | Pangos |
| 4,629,212 | A | 12/1986 | Takizawa et al. |
| 4,634,142 | A | 1/1987 | Woods et al. |
| 4,641,843 | A | 2/1987 | Morrisroe, Jr. |
| 4,647,003 | A | 3/1987 | Hilpert et al. |
| 4,647,069 | A | 3/1987 | Iijima |
| 4,673,172 | A | 6/1987 | Blanz |
| 4,674,767 | A | 6/1987 | Kuroki et al. |
| 4,685,689 | A | 8/1987 | Takizawa et al. |
| 4,714,271 | A | 12/1987 | Buma et al. |
| 4,726,571 | A | 2/1988 | Smith et al. |
| 4,733,876 | A | 3/1988 | Heider et al. |
| 4,817,922 | A | 4/1989 | Hovance |
| 4,823,550 | A | 4/1989 | Decker |
| 4,871,189 | A | 10/1989 | Van Breemen |
| 4,923,210 | A | 5/1990 | Heider et al. |
| 4,936,604 | A | 6/1990 | Kawagoe et al. |
| 4,946,134 | A | 8/1990 | Oriandi |
| 4,964,433 | A | 10/1990 | Marietta |
| 4,971,360 | A | 11/1990 | Pischke et al. |
| 5,003,864 | A | 4/1991 | Dyer |
| 5,014,748 | A | 5/1991 | Nogami et al. |
| 5,048,867 | A | 9/1991 | Gradert |
| 5,161,579 | A | 11/1992 | Anderson, Jr. |
| 5,161,817 | A | 11/1992 | Daum et al. |
| 5,312,119 | A | 5/1994 | Scheider et al. |
| 5,316,272 | A | 5/1994 | Davis |
| RE34,628 | E | 6/1994 | Fujishiro et al. |
| 5,347,457 | A | 9/1994 | Tanaka et al. |
| 5,375,819 | A * | 12/1994 | Galazin ............ B60G 17/0525 137/627.5 |
| 5,517,847 | A | 5/1996 | Campbell et al. |
| 5,521,821 | A | 5/1996 | Shimizu et al. |
| 5,560,591 | A | 10/1996 | Trudeau et al. |
| 5,584,497 | A | 12/1996 | Lander et al. |
| 5,651,555 | A | 7/1997 | O'Reilly et al. |
| 5,682,922 | A | 11/1997 | Galazin et al. |
| 5,707,045 | A | 1/1998 | Easter |
| 5,725,066 | A | 3/1998 | Bear et al. |
| 5,787,932 | A | 8/1998 | Pierce |
| 5,825,284 | A | 10/1998 | Dunwoody et al. |
| 5,859,692 | A | 1/1999 | Ross, Jr. et al. |
| 5,862,833 | A | 1/1999 | Perez |
| 5,921,532 | A | 7/1999 | Pierce et al. |
| 5,934,320 | A | 8/1999 | O'Reilly et al. |
| 5,979,504 | A | 11/1999 | Spivey |
| 5,988,067 | A | 11/1999 | Beck |
| 6,061,615 | A | 5/2000 | Karthaeuser |
| 6,173,740 | B1 | 1/2001 | Marinoni et al. |
| 6,202,992 | B1 | 3/2001 | O'Reilly et al. |
| 6,217,010 | B1 | 4/2001 | McNeely |
| 6,260,860 | B1 | 7/2001 | Brookes et al. |
| 6,332,623 | B1 | 12/2001 | Behmenburg et al. |
| 6,412,790 | B2 | 7/2002 | McKenzie et al. |
| 6,446,980 | B1 | 9/2002 | Kutscher et al. |
| 6,553,761 | B2 | 4/2003 | Beck |
| 6,623,016 | B2 | 9/2003 | Sulzyc et al. |
| 6,824,143 | B2 | 11/2004 | Choi |
| 6,918,600 | B2 | 7/2005 | Dodd et al. |
| 6,935,625 | B2 | 8/2005 | Bolt et al. |
| 6,945,275 | B2 | 9/2005 | Krechmery |
| 6,948,721 | B2 * | 9/2005 | Lee .................... B60G 17/0525 267/64.16 |
| 7,028,705 | B1 | 4/2006 | Krechmery |
| 7,028,996 | B2 | 4/2006 | Plath |
| 7,117,890 | B2 | 10/2006 | Ching |
| 7,192,012 | B2 | 3/2007 | Bolt et al. |
| 7,192,032 | B2 * | 3/2007 | Dodd ................ B60G 17/0155 280/124.16 |
| 7,204,478 | B2 * | 4/2007 | Plath ................ B60G 17/0525 267/64.17 |
| 7,650,905 | B2 | 1/2010 | Kubota et al. |
| 7,841,608 | B2 | 11/2010 | Morris et al. |
| 7,887,065 | B2 | 2/2011 | Trudeau et al. |
| 7,918,466 | B2 | 4/2011 | Steinbuchel |
| 8,047,551 | B2 * | 11/2011 | Morris ............... B60G 17/0525 137/625.21 |
| 8,191,904 | B2 | 6/2012 | Amlie et al. |
| 8,312,618 | B2 | 11/2012 | Hedman |
| 8,523,191 | B2 * | 9/2013 | Yagiela .................. B60G 9/003 280/124.157 |
| 8,973,922 | B2 | 3/2015 | Koelzer |
| 9,212,963 | B2 | 12/2015 | Kim |
| 2003/0067124 | A1 | 4/2003 | Kang |
| 2003/0085535 | A1 | 5/2003 | Choi |
| 2003/0172978 | A1 | 9/2003 | Rodriguez-Amaya et al. |
| 2003/0205869 | A1 | 11/2003 | Schutt |
| 2005/0212225 | A1 | 9/2005 | Suzuki et al. |
| 2008/0315539 | A1 | 12/2008 | Steinbuchel |
| 2009/0216403 | A1 | 8/2009 | Holbrook |
| 2010/0025946 | A1 | 2/2010 | Inoue et al. |
| 2010/0250065 | A1 | 9/2010 | Kelly et al. |
| 2017/0282671 | A1 * | 10/2017 | Gandhi ............... B60G 17/0525 |

* cited by examiner

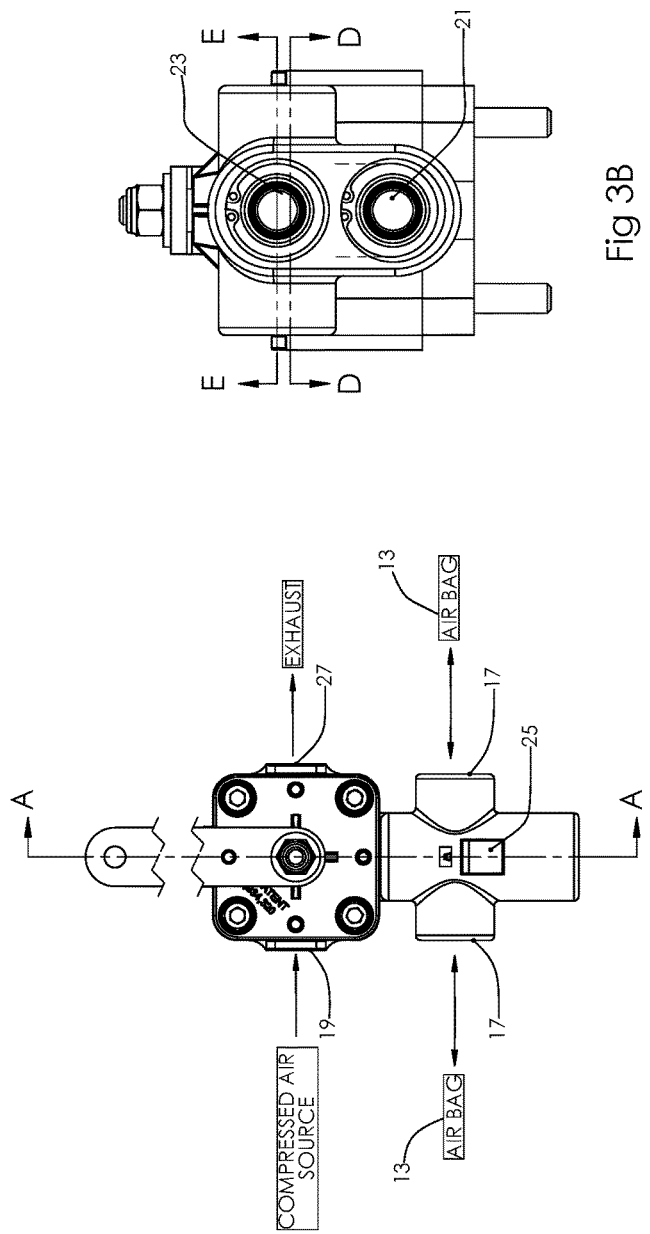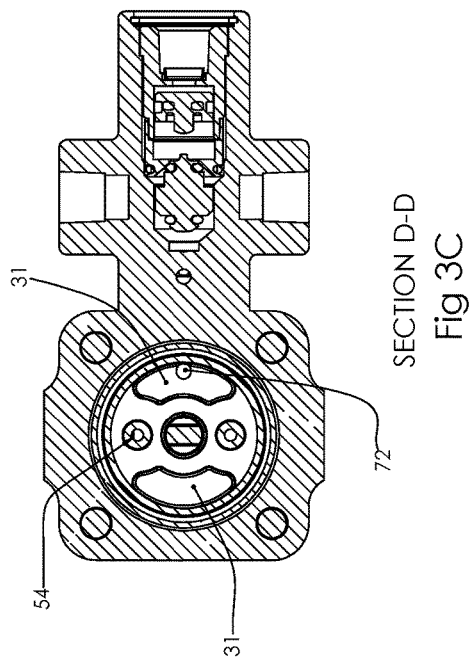

SECTION A-A

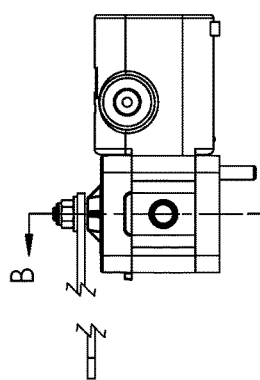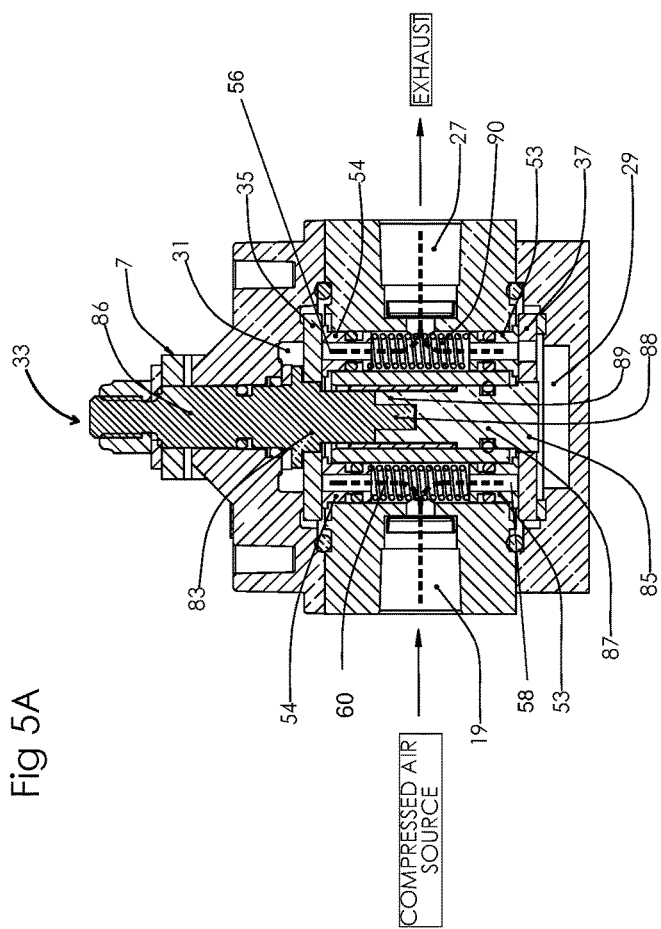

MODE A1
(Default Height)

MODE A2
(Raised Second Height)

MODE A3
(Quick Dump)

MODE B1
(Default Height)

MODE B2
(Lowered Second Height)

MODE B3
(Quick Dump)

MODE C1
(Default Height)

MODE C2
(Blocked Air Bags)

MODE C3
(Quick Dump)

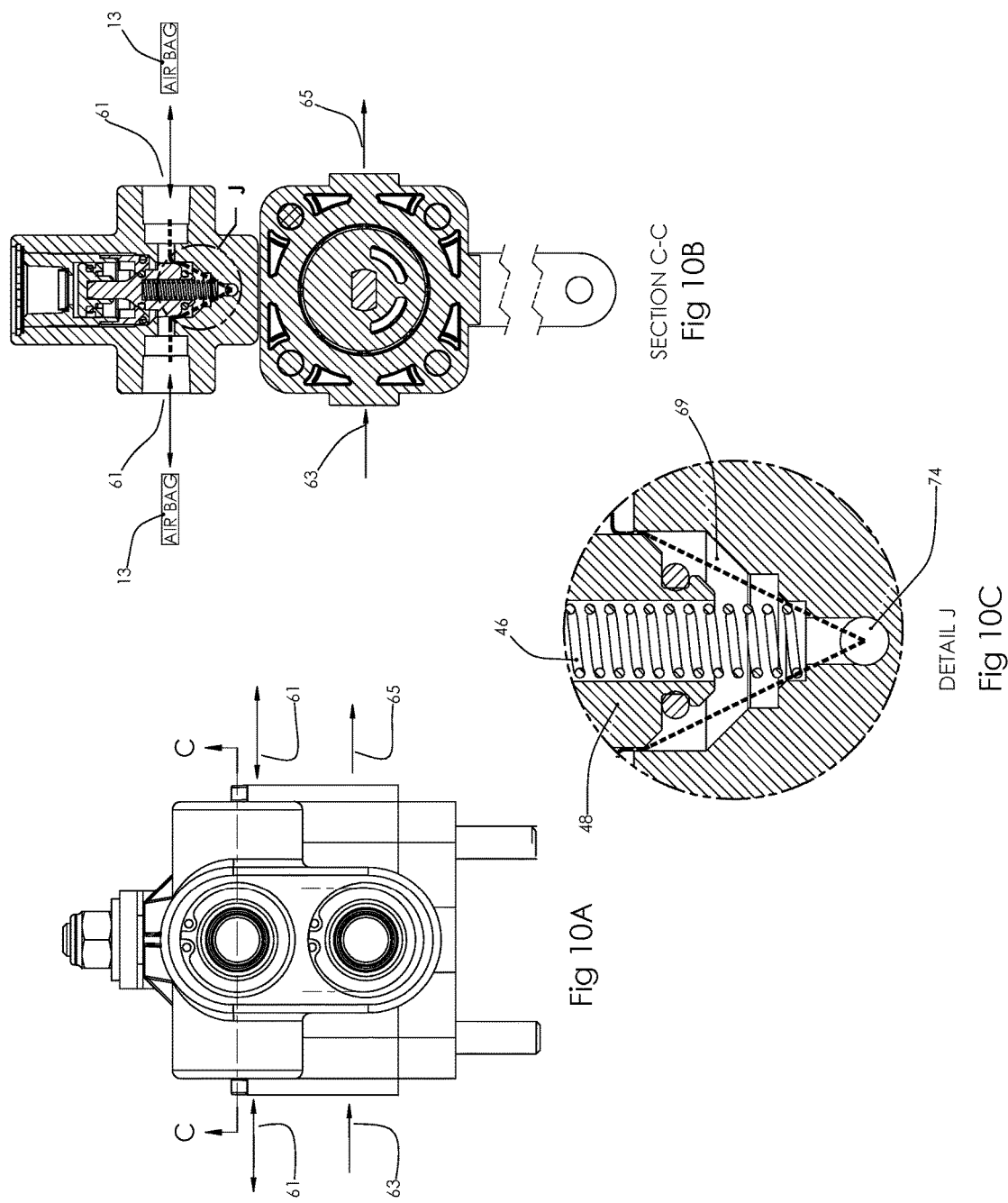

DETAIL K

SECTION A-A

SECTION G-G

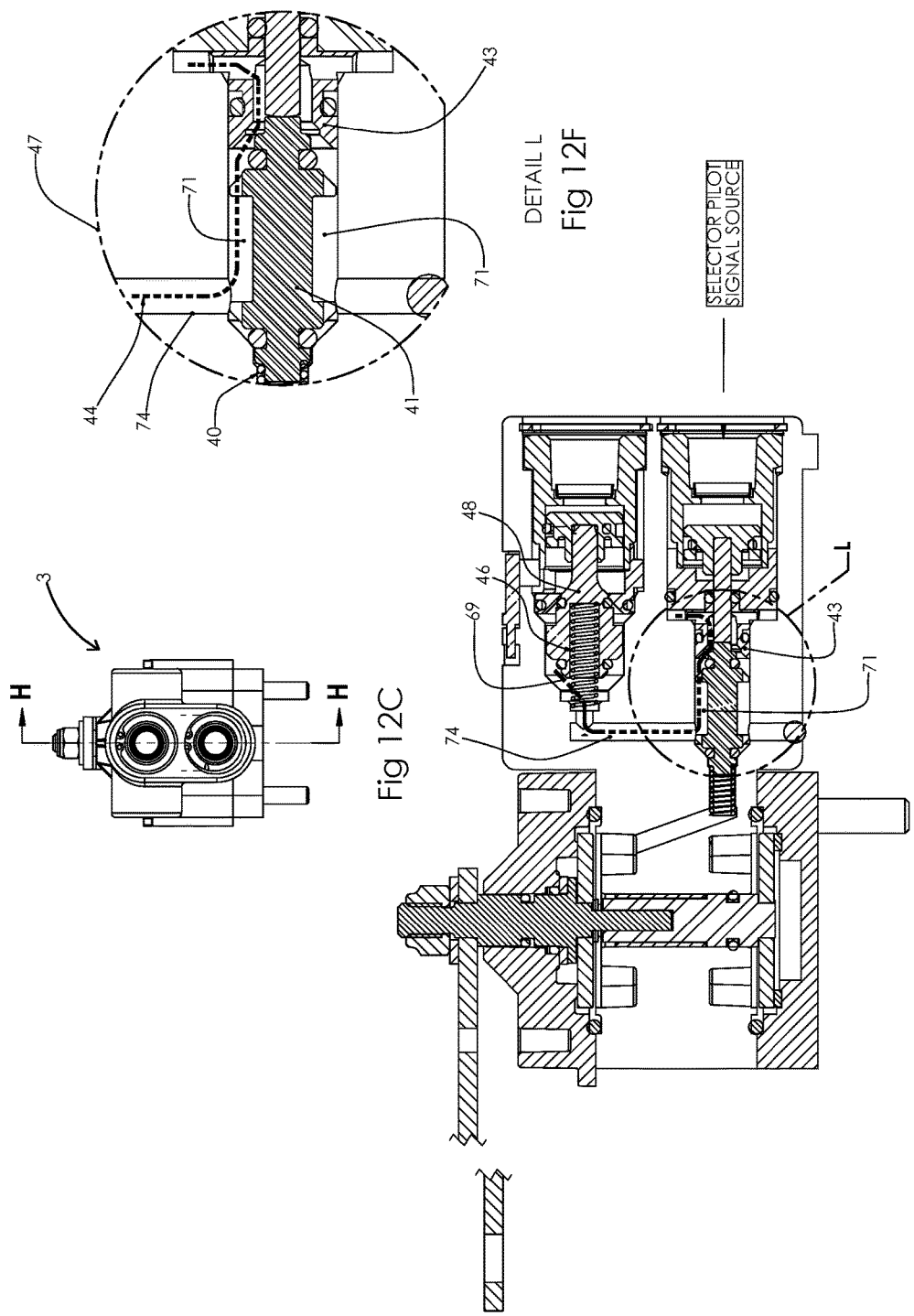

SECTION E-E

|  | First Ride height (default) | Secondary ride height | Blocking mode | Quick Exhaust (Air Dump) | Vehicle is stationary | Vehicle in motion |
|---|---|---|---|---|---|---|
| Configuration A | Active (H1) | Lifts the chassis up-Active* (H2) | N/A | from either ride height (H3) | available | available |
| Configuration B | Active (H1) | Brings Chassis down-Active* (H4) | N/A | from either ride height (H3) | available | available |
| Configuration C | Active (H1) | N/A | locks first ride height-Passive* (H1) | From either mode (H3) | available | available |
| Active mode | Valve performs it's function of maintaining vehicle ride height by responding to the road condition | | | | | |
| Passive mode | Valve locks the ride height and does not respond to road conditions, In other words air flow in & out from the valve is blocked | | | | | |

Fig 14

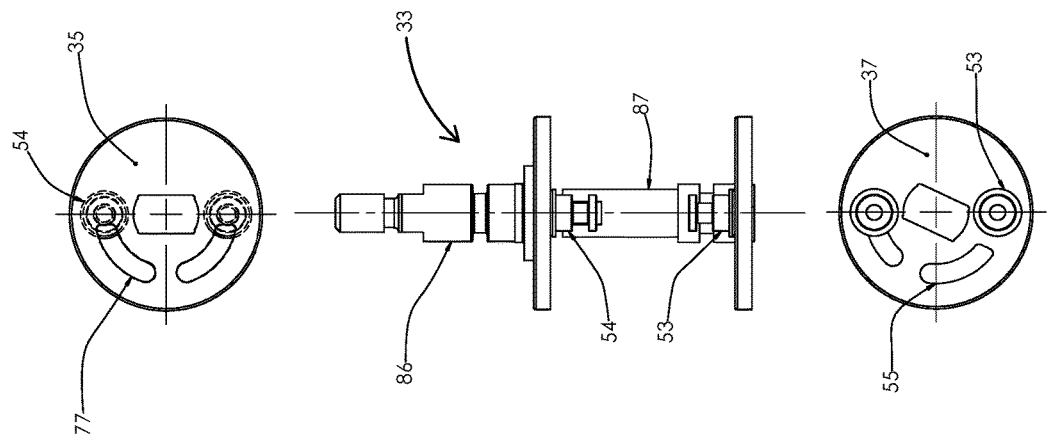
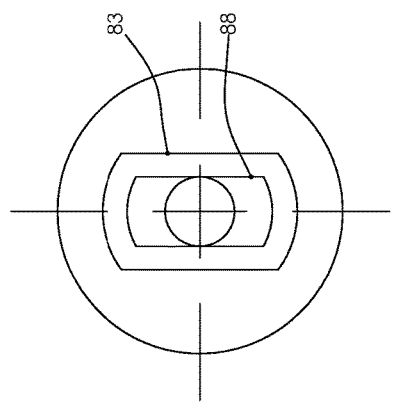
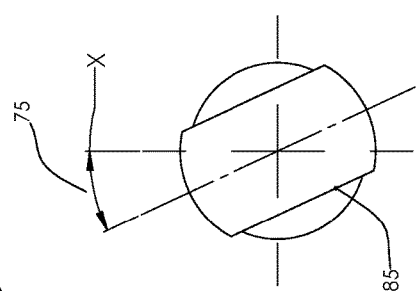
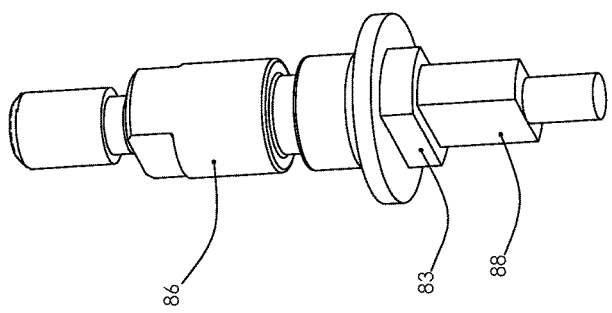

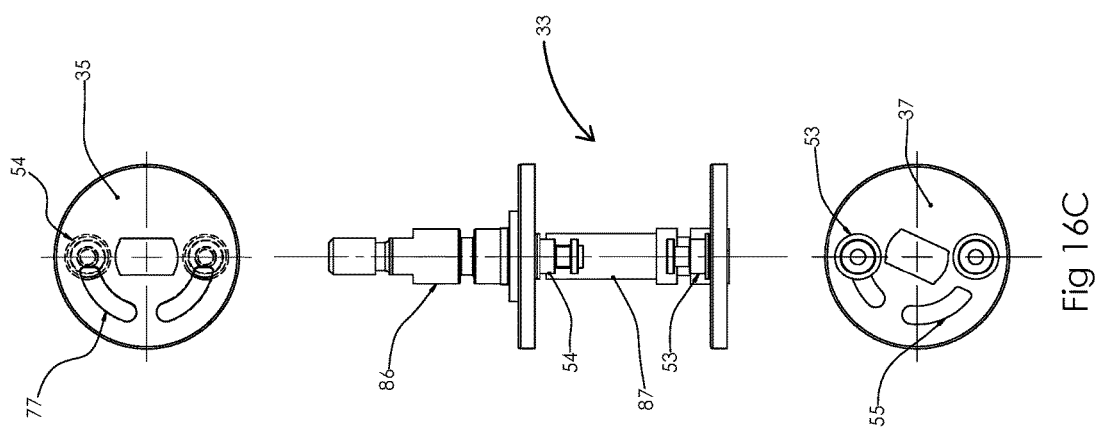
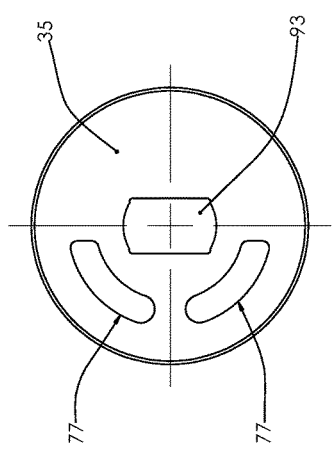
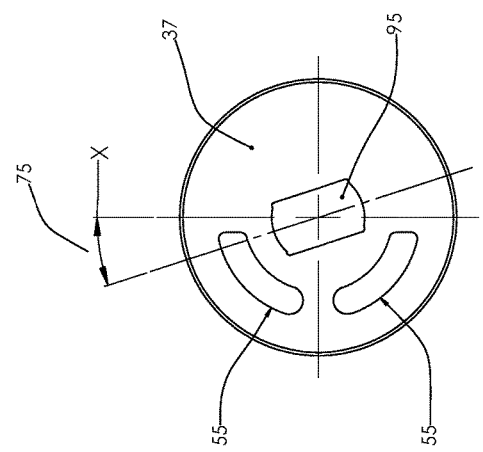

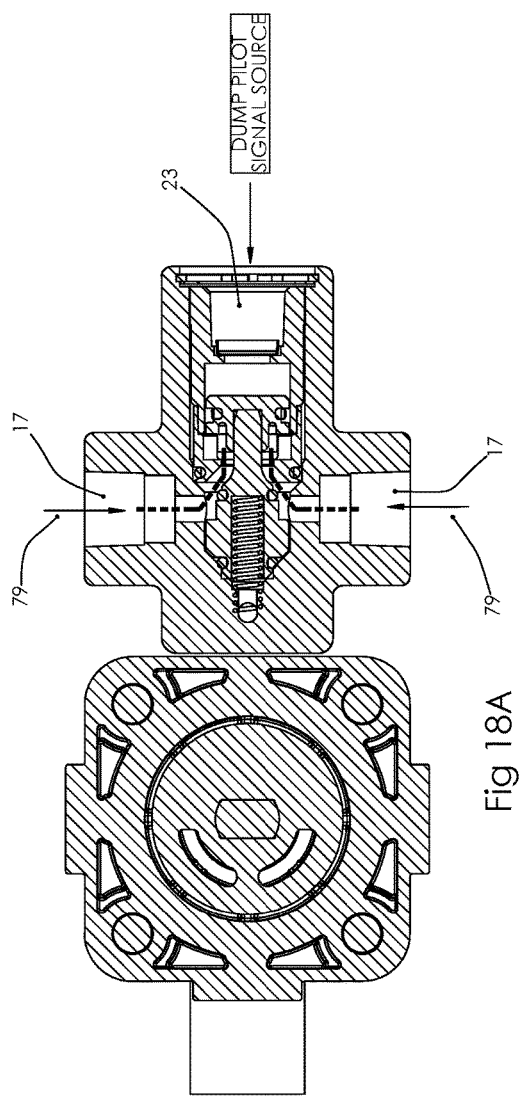
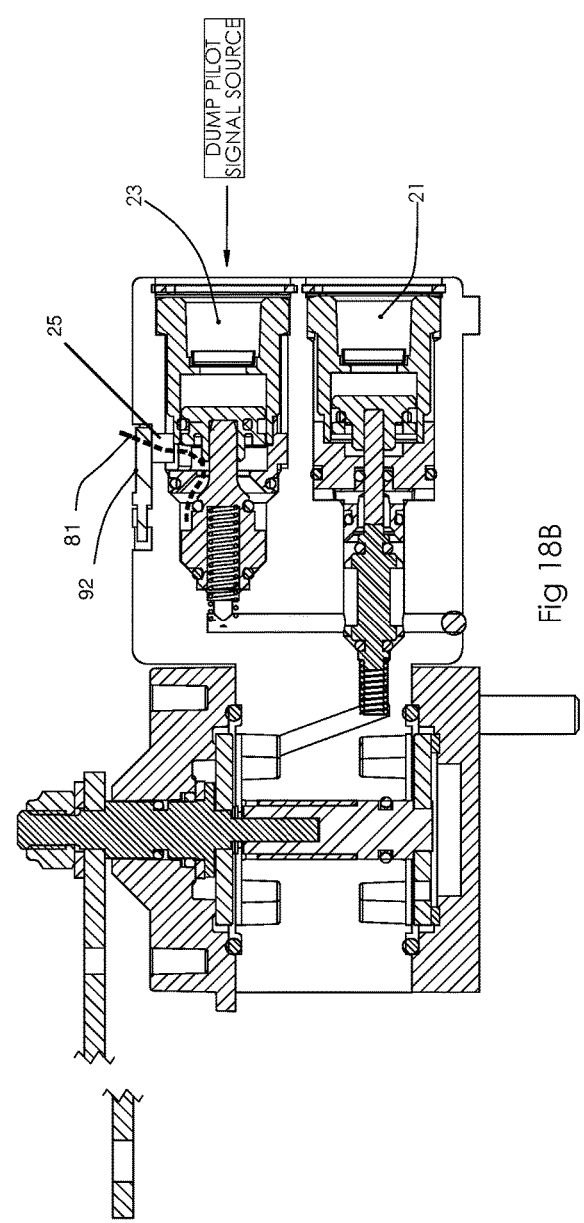
Fig 18A
Fig 18B

RIDE HEIGHT LEVELING WITH SELECTABLE CONFIGURATIONS SYSTEM AND METHOD

FIELD OF THE INVENTION

The present invention is generally related to the field of vehicle leveling systems and controllable valves.

BACKGROUND

Large vehicles such as trucks, tractors, trailers, tractor-trailers, cranes and other vocational vehicles, buses, and recreational vehicles utilize various systems to maintain a given distance between the vehicle chassis and the vehicle axle. Such systems are often designated as suspension systems. One such system is an air suspension system in which pressured air is used with inflatable air springs, also called air bags, as the elements which by more or less air in them adjust the distance between the vehicle chassis and the vehicle axle. That adjustment is controlled by a device called an air suspension valve. In some versions of these systems, as the load in the vehicle chassis increases causing it to lower, air is supplied into the air springs to compensate or maintain the same chassis height. Similarly, if the chassis is offloaded causing it to increase in height, then air is withdrawn from the air springs to maintain or lower the chassis to its set height.

BRIEF DESCRIPTION OF THE DRAWINGS

FIG. 3A is a top view of a configurable valve embodiment showing inlets, outlets, and air bag ports.

FIG. 3B is a front view of a configurable valve embodiment showing the selector and dump pilot ports.

FIG. 3C is a cross section view D-D of FIG. 3B of a configurable control valve embodiment showing the first ride height chamber and first ride height air passage.

FIG. 5A is a side view of a configurable control valve embodiment.

FIG. 5B is the cross-section side view through B-B of FIG. 5A of a configurable control valve embodiment.

FIG. 10A is a front view showing air flow during a default ride height configuration.

FIG. 10B is a top cross-section view through C-C of FIG. 10A showing air flow during a default ride height configuration.

FIG. 10C shows detail J from FIG. 10B.

FIG. 12C is a front view of a configurable valve showing the pilot signal ports. FIG. 12D is a side cross section view H-H from FIG. 12C partially showing air flow during a second ride height configuration.

FIG. 12F is shown cut-out detail L from the assembly as seen in FIG. 12D, showing air flow during a second ride height configuration and the ride height shuttle valve 41 forward position.

FIG. 14 is a table of Configurable Control valves and corresponding functionality.

FIGS. 15A-15B depict one embodiment of how the lower shaft 87 and the upper shaft 86 may be keyed to each other and to the upper and lower rotor valves. As detailed below, shaft components may be modified to effectuate a desired angular offset between rotor valves by changing the lower shaft key portion 85 at an angle (X degree) relative to the upper shaft key portion 83.

FIG. 15C shows combined views including the top view of the upper rotor valve, a side view of the shaft assembly and pressure seals, and a top view of the lower rotor valve. The rotor valve is shown highlighting phase angles corresponding to the normal height rotor apertures and the second height rotor apertures by the implementation of angular offset between two shafts.

FIGS. 16A-16B show how the lower rotor valve angular position relative to the upper rotor valve position can be modified to a desired angular offset by changing the lower rotor slot portion 95. FIG. 16C shows combined views including the top view of the upper rotor valve, a side view of the shaft assembly and pressure seals, and a top view of the lower rotor valve. The rotor valve is shown highlighting phase angles corresponding to the normal height rotor valve apertures and the second height rotor valve apertures by the implementation of angular offset between two rotors valves.

FIG. 18A is a top cross section view showing air flow during operation of an embodiment of a valve during the dump mode.

FIG. 18B is a side cross section view showing air flow during operation of an embodiment of a valve during the dump mode.

DETAILED DESCRIPTION

Figure 1:
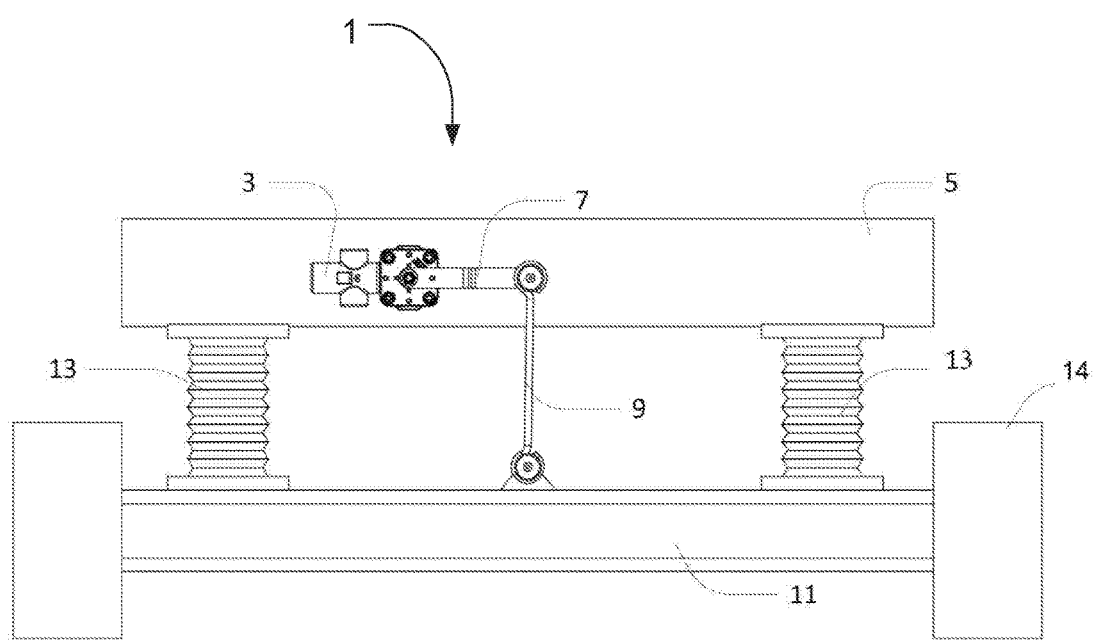
FIG. 1 is an overview of a vehicle leveling system incorporating a configurable control valve.

The contents of the following U.S. patents are incorporated herein by this reference: U.S. Pat. Nos. 5,651,555; 8,191,904; 7,117,890; 7,028,705; 6,945,275; 6,202,992; 5,934,320; and 8,770,274. The present invention refers to systems and devices that can be operative by a pressurized fluid in that sense meaning selected liquids and gases including air. In the following description the embodiments will be described in the context of a pressurized air system. Nevertheless it is intended that the material used and referred to as air can also be some other gas or a liquid, in other words, fluids.

In the present application, a system and method for a configurable leveling air suspension is disclosed. In various embodiments, the air suspension system operates to control a pneumatic leveling system for vehicles providing the capability for an operator to select a change of ride height, block air flow in and out of the air springs or air bags, and to quickly exhaust the pneumatic air bags which control the ride height. In various embodiments, the modular design of the valve components allows for an easily configurable valve which may be customized to a particular application with a minimum effort and manufacturing cost.

In various embodiments, the valve utilizes a plurality of rotary disks incorporating apertures, wherein the disks form a valve between ports which connect various inlet and outlet chambers such that the pneumatically selected operative disk apertures and ports provide air flow in or out of leveling air bags to maintain a selected ride height, a change of ride height or to block pneumatic leveling.

In various embodiments, the rotational offset or angular offset between the apertures in the rotational disks or rotor valves may be configured and calibrated to control specified ride heights which are proportional to the angular offset between the disk apertures. In various embodiments, the offset angle between rotational disks apertures may be implemented by various methods for keying or angularly fixing the rotational valves to the shaft which is mechanically linked to rotate according to the vehicle chassis to axle distance.

In various embodiments of the system, the valve may be manufactured to have available selection of one of multiple configurations including in addition to the default leveled ride height, a second under-inflation (lowered ride height) mode, over inflation (raised ride height) mode, an air bag flow blocking mode and air bag dump mode. The various configurations and modes of operation are accomplished by purely mechanical means for the pneumatic functions and controlled pneumatically, without the need for complex electrical and software components.

In various embodiments, the valve may be manufactured for a particular user's needs in which different configurations are available which include a configuration A, a configuration B and a configuration C, wherein each configuration is operable in three operator controllable modes, as described below.

In various configurations, the selected configuration is implemented by a lever or handle which rotates according to chassis to axle distance, and a modular shaft connecting dual rotor valves in a single assembly. Components of the modular shaft can be keyed or indexed in order to provide a selected angular offset by which two height settings can be selectively implemented.

Some definitions are helpful:

Default ride height: this term is also called "normal" and defines a ride height that places the vehicle in a designated ride height that would be considered for general operation of the vehicle absent any special considerations.

Elevated Ride height: this term defines a ride height in which the supported structure is lifted to a designated height above the default ride height.

Lowered ride height: this term defines a ride height in which the supported structure is lowered to a designated height below the default ride height.

Blocking mode: this term defines a condition in which air is blocked from flowing in or out of the air bags.

Rotor valve: this term defines the two disk shaped valves, including the upper rotor valve and the lower rotor valve which function to pass pressurized air to and from the air bags to maintain the set ride height under changing load and road conditions. Typically, rotor valves have a "dead band" in a default position for normal riding in which up and down movement of the vehicle axle(s) relative to the chassis does not cause any reaction of the pressurization system; this prevents relatively small movement of the valve from causing the compressed air system from operating excessively.

Air flow: this term designates a condition of pressurized air flowing in a particular path to maintain a ride height by inflating or deflating the air bags, to change the set ride height, or to dump air quickly from the air bags.

Configurable valve: this term shown as 3 (see FIG. 1) in the following description is the overall structure and in some cases is merely referred to as the "valve" for simplicity.

Dynamic: this term refers to action of the system as in any configuration in which the lever is rotated by the chassis during operation of the vehicle causing functioning of the valve. Examples are when a chassis is being loaded or unloaded, or when it is being driven over rough road. It is noted that in all configurations the rotor valves provide a deadband of rotation in response to movement of the lever which will not allow any air flow. It is only when a rotation occurs beyond the deadband that dynamic operation occurs.

A configurable control leveling valve and valve system herein described in various embodiments is utilized as a dynamic suspension system for a commercial vehicle (such as a truck, tractor, trailer or buses), that controls air flow into and out of air springs (also called an air bags) to maintain air spring height at a designated or preset level. A supported structure (called vehicle chassis or vehicle frame) is maintained at an optimum height against positional variations relative to a supporting structure (called axle). The system is further developed to provide a selectable secondary height which can be an elevated height or lowered height compared to a first height that can be set and maintained by activation of a pilot signal (actuated either by pneumatic or electrical signal) and will level the supported structure at a secondary height against positional variations relative to the supporting structure. In various embodiments the configurable control leveling valve and valve system can be used to choose any of the two heights depending upon the application. The valve system can also be modified to block the flow of air into and out of the air spring to maintain the fluid pressure inside the air spring by an activation of a pilot signal thereby to bypass the leveling function of the valve system.

As will be understood by the following, the valve can be manufactured to operate under any of three distinct configurations which are designated as Configuration A, Configuration B. and Configuration C. The configurations are given the following functional descriptions or headings based on the common first mode which is the default mode in each configuration Configuration A: second mode is raised or over inflation;

Configuration B: second mode is lowered or under inflation;

Configuration C: second mode is a blocking mode.

The solution provided by this mechanically controlled valve which can operate completely by pneumatic means is simpler and more cost effective than alternative systems. The technical solution employs a valve assembly that can be easily configured to the selected one of the three configurations by very simple substitution of a part or parts. Therefore a customer's request with selected variable values is provided along with the selected configuration, and the configurable leveling valve can be easily constructed from basic common parts with a few specially made parts to operate according to the customer's request An overview of an exemplary embodiment is shown in FIG. 1. A vehicle leveling system 1 is shown. In the shown embodiment, a configurable control valve 3 is installed on a vehicle chassis 5 (also called a supporting frame structure) of commercial transportation vehicles. The configurable control valve 3 is constructed with a valve body 4 which is attached to the vehicle chassis or frame structure 5 via a bracket (not shown) while a handle or lever 7 of the configurable control valve 3 is connected to a linkage 9 that is attached to a vehicle axle 11 and wheels or tires 14. In one mode of operation as the vehicle chassis 5 is loaded, air bags 13 are compressed, lowering the chassis. As the chassis lowers, the valve lever rotates counter clockwise in this embodiment, causing valve ports to open such that air is sent to the air bags 13 to counter the lowering of the chassis and restore it to a selected height. The selected height is enabled through either a first ride height chamber or a second ride height chamber as selected by a pneumatic pilot signal sent by the operator, which is described in detail below.

Figure 2:
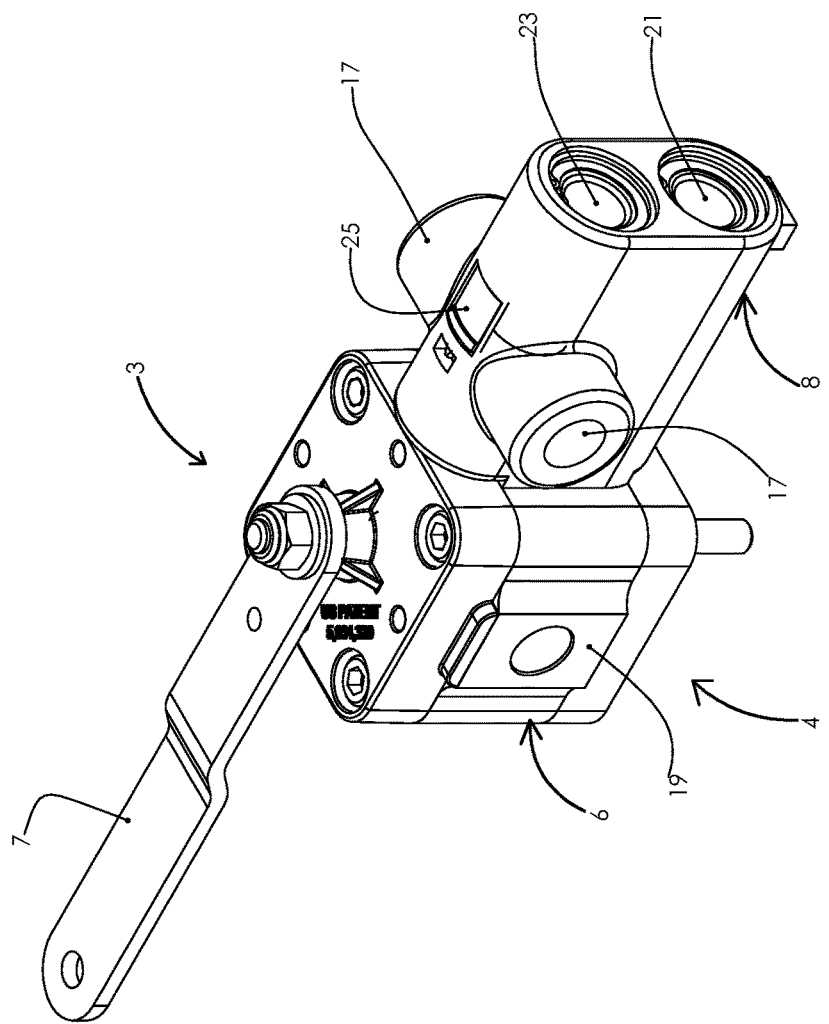
FIG. 2 is an isometric view of an embodiment of a configurable control valve.

An isometric view of an exemplary embodiment is shown in FIG. 2. From this view the configurable control valve 3 can be seen as having a valve body 4 which can be considered as having two primary modules, a duplex rotor valve module 6 and a pilot selection module 8. As will be seen, the duplex rotor valve module 6 controls pressured air from a source (typically a compressed air system) past one or the other of the upper rotor valve 35 or the lower rotor valve 37 for dynamic leveling or air flow blocking according to pneumatic connections selected by pilot selection module 8. The pilot selection module 8 also controls the air bag dump mode. The pilot selection module 8 is set to a configuration execution, directed by pilot input to allow incoming air from the duplex rotor valve module 6 to execute the desired instruction. It acts also for directing air bag dump actions independently of the duplex rotor valve module 6. Several of the basic components of the configurable control valve 3 and each of the a duplex rotor valve band pilot selection module 8 are visible, including the valve lever or handle 7, air bag ports 17, an air input port (inlet) 19, a selector pilot port 21 for ride height (or blocking mode) control, a pneumatic control dump valve port (also called a dump pilot port) 23, and a dump port 25.

Figure 4:
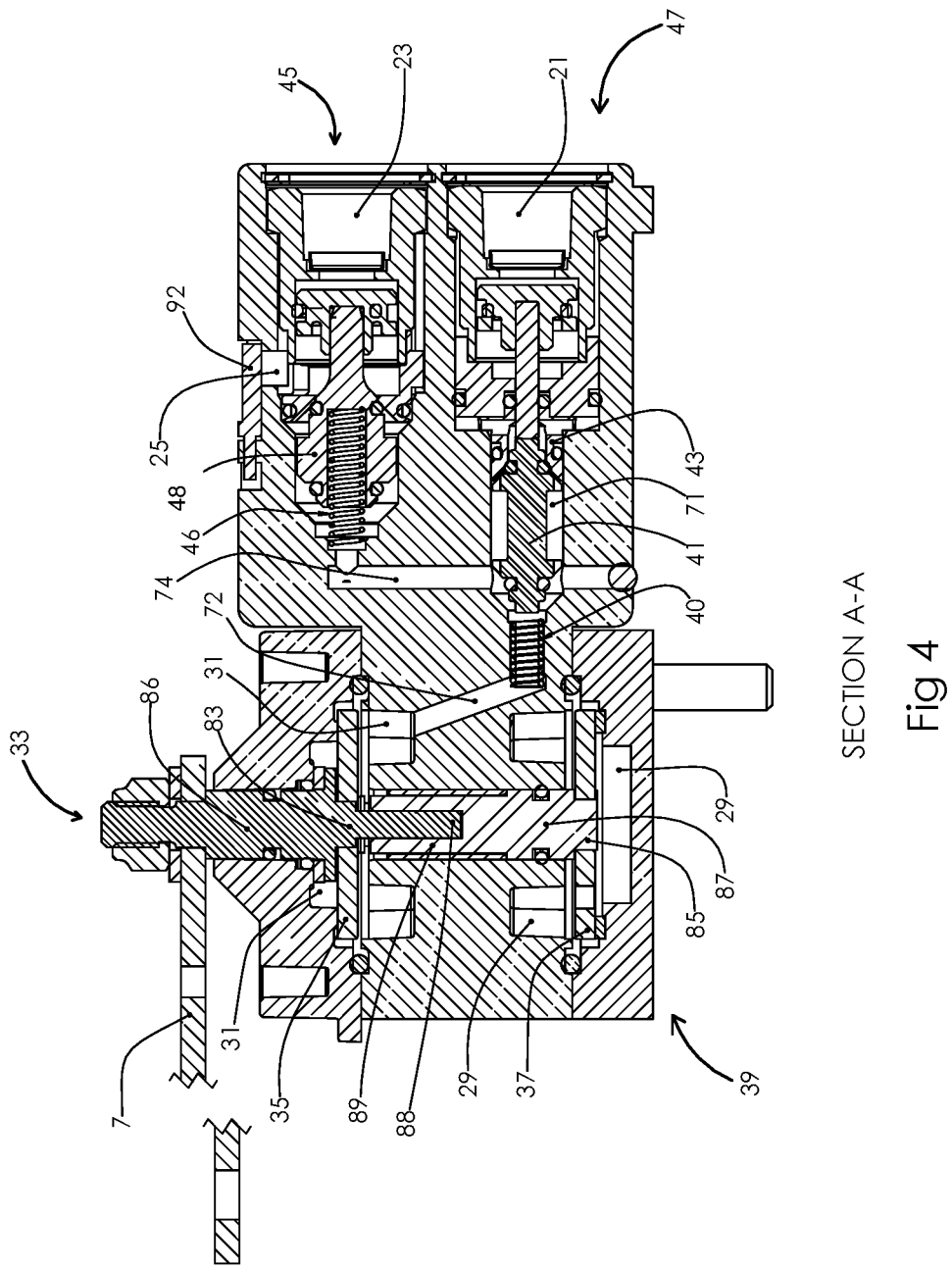
FIG. 4 is the cross-section side view A-A of FIG. 3A of a configurable control valve embodiment.

FIGS. 3A, 3B, 3C as well as FIG. 4 show the external ports and ride height chambers of an exemplary embodiment of the configurable control valve 3, In FIG. 3A a top view is shown. During dynamic leveling inflation (raising the vehicle chassis to dynamically maintain a set ride height) operation of the valve, from a compressed air source CA, air flows in through the inlet port 19 and into the vehicle air bags 13 through air bag ports 17. During standard deflation (lowering chassis) air flows from the air bags 13 in through ports 17 and out through exhaust port 27. During standard dump mode, air flows directly from the air bags 13 in through ports 17 out through the dump port 25. The dump port 25 is protected against debris entering the valve by a flap 92 of an elastomeric material that lifts as the dump of air takes place. This process is further detailed below.

FIG. 3B shows a front view of the exemplary embodiment of a configurable control valve 3. Pilot signal ports for selecting alternative operation modes are shown. The top port, called the dump pilot port 23 is utilized for selecting the dump mode and opening air flow directly from the air bags 13 out to the dump port 25 lifting the elastomeric flap 92. The bottom port is the selector pilot port 21, which is operated to either select the ride height or to select the blocking mode in various valve configurations.

FIG. 3C a section D-D of FIG. 3B, shows a cross section view of the of the exemplary configurable control valve 3. In this embodiment, air flows in through the first ride height chamber 31 during default operation. In secondary modes of operation detailed below, air flows in through the second ride height chamber 29 during second ride height operation, or is blocked from flowing during blocking mode operation after entering the second chamber.

FIG. 4 shows a more detailed cross section A-A of the exemplary configurable control valve 3 with various components identified. A duplex rotor seal assembly 39 is shown on the left and a height change selector assembly 47 is shown on the right. The valve lever or handle 7 is shown. A valve shaft assembly 33 comprises a valve shaft 34 (see FIG. 15A-15D) and an upper rotor valve 35 and a lower rotor valve 37, In this embodiment the valve shaft 34 comprises an upper shaft portion 86 and a lower shaft portion 87 where the upper rotor valve 35 is fixed on the upper shaft portion 86 and the lower rotor valve 37 is fixed on the lower shaft portion 87. The lever 7 rotates as the vehicle chassis raises and lowers relative to the axle to which the link 9 is attached, thereby rotating the valve shaft assembly 33 which in turn rotates the rotor valves 35 and 37 which typically contain apertures which pass air into the ride height chambers 29 or 31 during operation in various modes, as detailed below. A ride height shuttle valve 41 has two positions. The first position, a default bias position (to the right in FIG. 4) into which spring 40 biases the ride height shuttle valve 41. The second position, a pilot signal actuated position (to the left in FIG. 4) in which the pilot signal causes the spring biasing to be overcome. The ride height shuttle valve 41 is utilized to divert air from the selected height chamber when pneumatic pressure (also called a pilot signal) is applied at the selector pilot port 21, and/or may be selected to block flow in a valve configuration which utilizes a valve seat 43 which has an orifice 84 or alternatively valve seat 89 which has no ports. Alternatively the valve seat 89 can be made with orifice 84 blocked (see FIG. 21A and 21B). There is a dump assembly 45 having a dump pilot port 23 which is in pneumatic communication with dump shuttle valve 48. When pneumatic pressure is applied to the dump pilot port 23 the dump shuttle valve 48 moves to overcome the spring biasing from spring 46 thereby opening a passage to the air bags 13 such that the air bags 13 are opened directly to the dump port 25 thereby executing the dump mode as the air is dumped from the air bags 13. Experimentally tested embodiments have demonstrated an increase of exhaust flow rate of approximately 3 times when using the dump feature. Other features of the valve are shown in FIG. 4 including the first ride height air passage 72, the common transfer air passage 74, the shaft assembly 33, and other components detailed herein. Additional parts referenced in the figure are described herein.

FIGS. 5A and 5B show a side view and a cross section B-B view of a valve embodiment respectively which are illustrative of other valve components. The input air flow path 10 from the compressed air source is shown flowing into inlet port 19 into what would be a ready to use air loading condition into upper pressure seals 54 through upper pressure seal orifice 56 and lower pressure seals 53 through lower pressure seal orifice 58. The upper and lower pressure seals 54 and 53 are biased into sealing pressure against the respective upper rotor valve 35 and lower rotor valve 37 by seal springs 90 which requires precision surface finishing of both the rotor valve surface and the pressure seal surfaces to ensure sealing. The rotor valves including upper rotor valve 35 and lower rotor valve 37 are fixed and precisely rotationally keyed to the valve shaft 34. The upper pressure seals 54 maintain air tight contact with the upper rotor valve 37 and the lower pressure seals 53 maintain air tight contact with the lower rotor valve 37 when the pressure seal apertures and rotor valve apertures are not aligned or overlapping.

Figure 6:
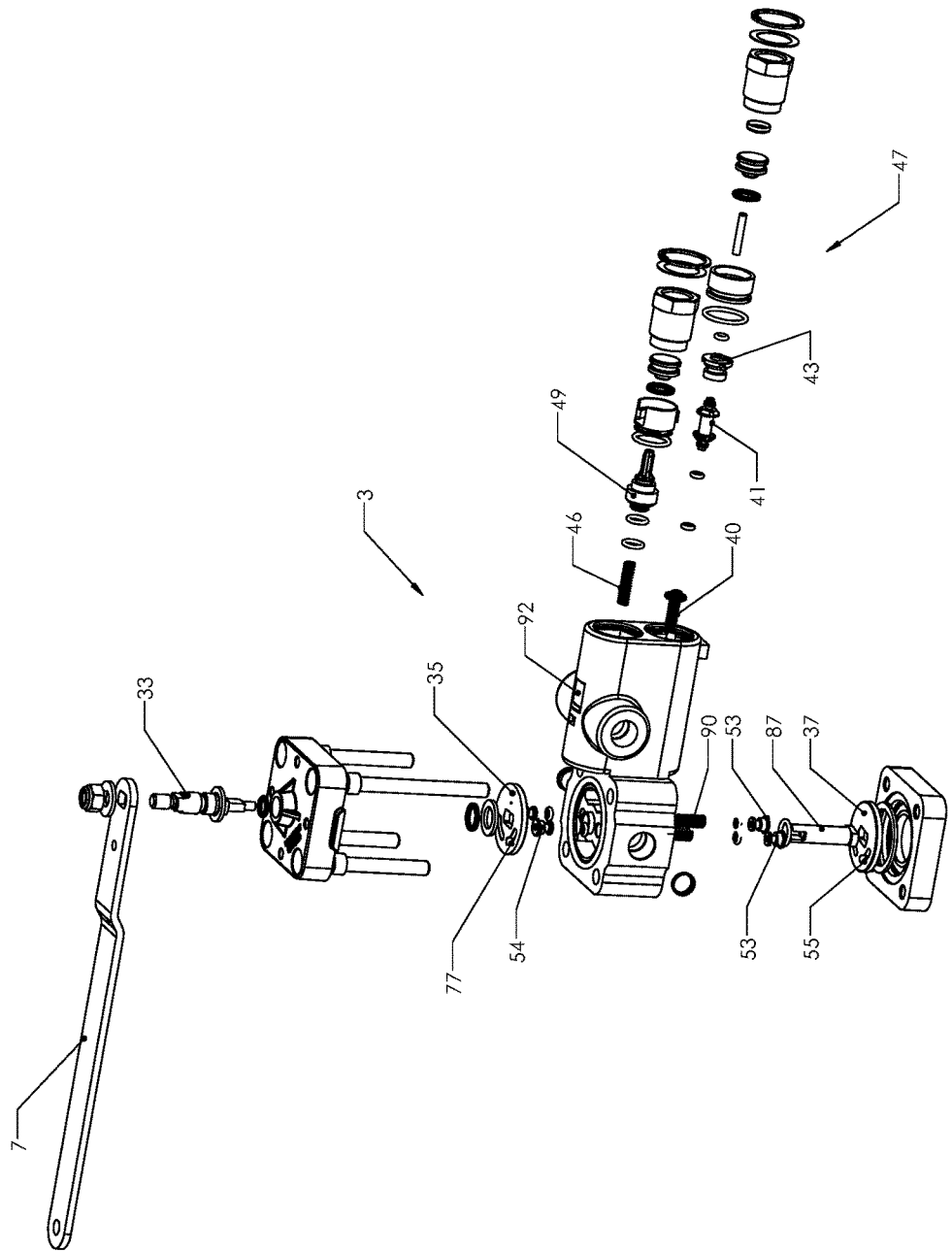
FIG. 6 is an exploded isometric view of a configurable control valve embodiment.

An exploded view of the embodiment of an exemplary configurable valve is shown in FIG. 6 to further detail the components of the valve. As the vehicle chassis to axle distance changes during loading or road conditions, valve lever 7 rotates, turning the valve shaft assembly 33 and in turn the upper and lower rotor valves 35 and 37. Lower pressure seals 53 and upper pressure seals 54 are pressed against the upper rotor valve 35 and the lower rotor valve 37 respectively which pass air through to the respective lower rotor valve apertures 55 and upper rotor valve apertures 77 (see FIG. 15C) when the rotation of the valve shaft assembly 33 via the lever 7 causes alignment of the pressure seal and rotor valve apertures. The valve body 4 is designed to incorporate the various ports and valve chambers comprising the duplex rotor valve module 6 and the pilot selection module 8.

The selector pilot port assembly 47 and the dump pilot assembly 45 comprise various components which seal against the side of the port walls and slide to open or close air pathways including the ride height shuttle valve 41 and the valve seat 43 which are utilized for ride height selection and blocking mode selection. The dump shuttle valve 49 slides within the dump pilot assembly 45.

Figure 7A:
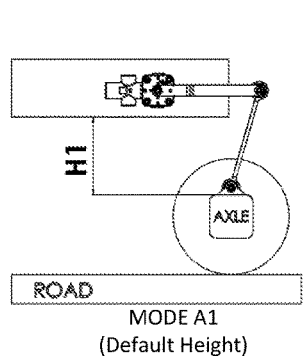
FIG. 7A-7C are the operating modes for a configurable control valve embodiment showing a configuration designated Configuration A with a first ride height as a default ride height mode and a second ride height mode in which the chassis is raised above the default ride height and a third ride height from a dump mode.
Figure 7B:
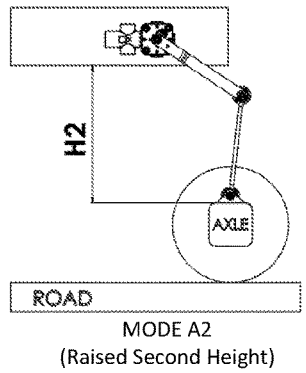
Figure 7C:
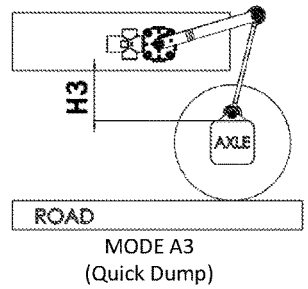

The configurable valve may be manufactured according to customer specifications in at least three configurations utilizing a minimum of valve component modifications or the simple substitution of pre-configured valve components, in order to operate in one of three modes for each specified configuration. As will be appreciated then, the common portion of the valve 3 only requires an adjustment of the relative mounting of the lower rotor valve. The operational modes for each configuration are shown in FIGS. 7A-7C for configuration A, FIGS. 8A-8C for configuration B and FIGS. 9A-9C for configuration C. These are further described in FIG. 14.

In FIGS. 7A-7C, operational modes for configuration A are shown. For this valve configuration, the valve operates dynamically to maintain level ride height. By the utilization of the selector pilot port 21, the valve will operate to maintain the chassis to axle height H1 in default (also called normal) mode A1 (FIG. 7A), or chassis to axle height H2 in the over inflation or elevated ride height mode A2 (FIG. 7B) or by utilization of the dump pilot port 23 for dump mode A3 (FIG. 7C) which results in rapid exhaust of air from the air bags and consequential lowering of the vehicle chassis as shown in FIG. 7C. The configuration mode A2 operation allows change from the default position to a raised ride position and has application benefits including the following applications:

For tractors—raise the suspension chassis of a tractor to increase under vehicle clearance;

For trailers—raise the suspension for docking or undocking a trailer;

For buses and coaches—raise the suspension for additional under vehicle clearance.

Figure 8A:
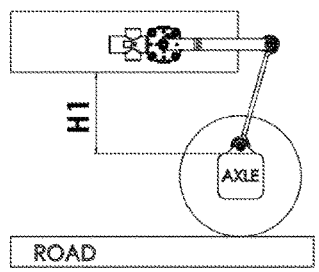
FIG. 8A-8C are the operating modes for a configurable control valve embodiment showing a configuration designated Configuration B with a first ride height as a default ride height mode and a second ride height mode in which the chassis is lowered below the default ride height and a third ride height from a dump mode.
Figure 8B:
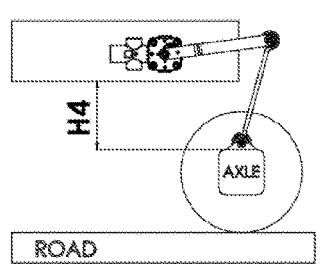
Figure 8C:
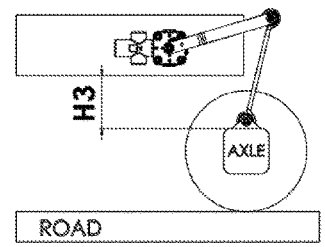

In FIGS. 8A-8C operational modes for configuration B are shown. By the utilization of the selector pilot port 21 the configurable control valve 3 may be operated to maintain the chassis to axle height H1 in normal or default mode B1 (FIG. 8A), or chassis to axle height H2 in under-inflation or lowered ride height mode B2 (FIG. 8B) or by utilization of the dump pilot port 23 in mode B3 (FIG. 8C) which results in rapid dumping of air from the air bags and consequential lowering of the vehicle chassis as shown in FIG. 8C. The valve configuration B operation allows the operator to change ride height from the default position to a lowered ride position and has application benefits including the following:

a) Tractor—improved aerodynamics;

b) Trailer—lowering the suspension height for clearing overhead obstacles and for adjusting the trailer bed to a dock height;

c) Buses and coaches—lowering the suspension to assist loading and unloading of passengers and for improved aerodynamics.

Figure 9A:
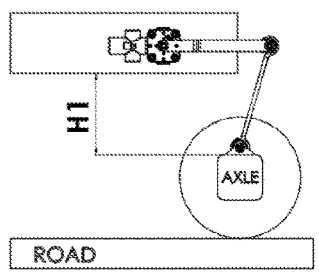
FIG. 9A-9C are the operating modes for a configurable control valve embodiment showing a configuration designated Configuration C with a first ride height as a default ride height and a second ride mode blocking air bag ports and a third ride height from a dump mode.
Figure 9B:
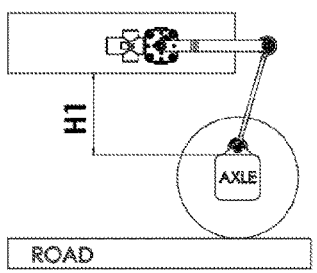
Figure 9C:
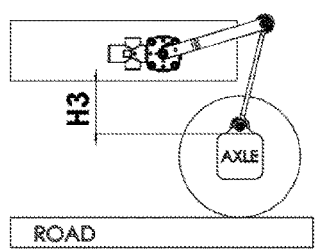

In FIGS. 9A-9C operational modes for configuration C are shown. For this valve configuration, the valve operates either dynamically or to block air flow in and out of the air bags. By utilization of the pneumatic selection ports, the valve may be operated to maintain the chassis to axle height H1 in normal or default mode C1 (FIG. 9A), blocked mode with a air flow in and out of the air bags blocked (shown with calibration load height H1) in mode C2 in FIG. 9B, or dump mode C3 which results in rapid exhaust of air from the air bags and consequential lowering of the vehicle chassis as shown in FIG. 9C. This secondary blocking valve configuration provides a secondary mode of operation which allows blocking of the air bag ports. It has application benefits including the following:

a) Vocational vehicles (e.g. cranes) often have high centers of gravity. For stability, outriggers may be deployed raising the vehicle's wheels 14 from the ground. In this condition the chassis height results in the valve handle 7 rotating into the exhaust mode. The quick lowering of the vehicle onto its wheels and deflated air bags is known to cause damage to the air bags. The valve configuration C which includes blocking mode C2 inhibits the deflation of the air bags 13.

b) Blocking dynamic leveling reduces air consumption and operation of the associated air compressor system which in turn improves vehicle fuel efficiency.

Detailed air flow which occurs during dynamic leveling for the default ride height is shown in FIGS. 10A-10E. Note that when the vehicle chassis to axle height remains within a margin referred to as the deadband (which may vary in a range between about +/−1 deg to about +/−2 degrees for a given ride height, the valve is configured not to have air flow, or not to pneumatically connect the air bags to either the compressed air source or the exhaust. FIGS. 10A-10E depict various valve views and cross-sectional views which illustrate dynamic leveling air flow through the valve during (default) operational modes of each valve configuration, namely A1, B1, and C1.

FIG. 10A is a front view of the valve showing the pilot ports, air inlet flow 63, air exhaust flow 65 and the air bag air flow 61 in and out of the air bags.

FIG. 10B is cross section C-C of FIG. 10A further illustrating the air bag air flow 61 as well as the compressed air input or air inlet flow 63 and air exhaust flow 65.

FIG. 10C is a detail view J from FIG. 10B which shows the dump shuttle valve 48, dump chamber 69 and common transfer air passage 74. The dashed lines depict air flow pathways.

Figure 10E:
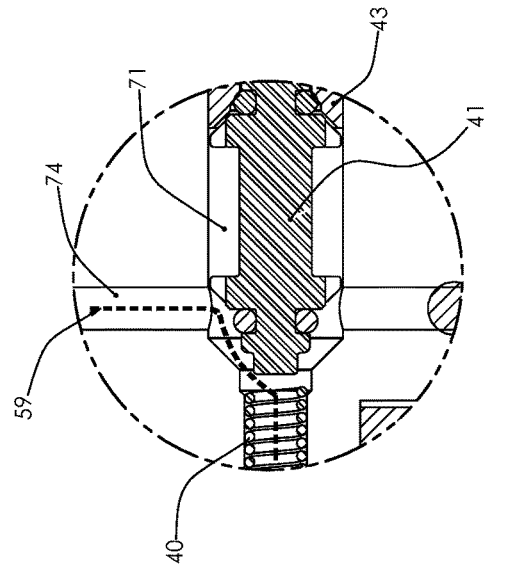
FIG. 10E shows detail K from FIG. 10D showing air flow during a first ride height configuration including the ride height shuttle valve 41 position in the non-actuated or default bias position.
Figure 10D:
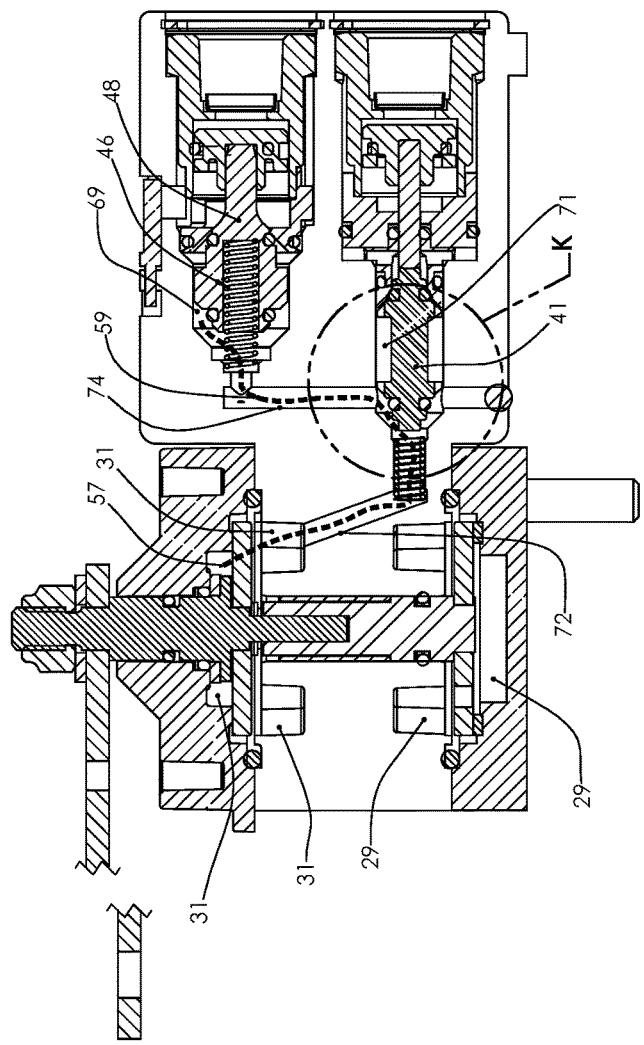
FIG. 10D is a side cross section view A-A of FIG. 3A showing air flow during a default ride height configuration.

FIG. 10D is cross-sectional view A-A from FIG. 3A, which illustrates a portion of the air flow during dynamic leveling in the valve default mode. When the rotor valve and pressure seals are appropriately aligned by the valve lever rotation, air flows through the then contiguous default or first ride height chamber 31 and follows air pathway beginning at 57 through the first ride height passage 72, past the ride height pilot shuttle valve 41 and selector chamber 71, continuing along pathway 59 through the common transfer passage 74 into the dump chamber 69. For illustration, also shown are the dump shuttle valve 48 and dump pilot bias spring 46.

FIG. 10E is a view of detail K from FIG. 10D. As shown for the default modes A1, B1 and C1, are the positions of the ride height shuttle valve 41 and the valve seat 43. Air flow during dynamic leveling is shown along path 59 through the selector chamber 71 and common transfer passage 74.

Figure 11:
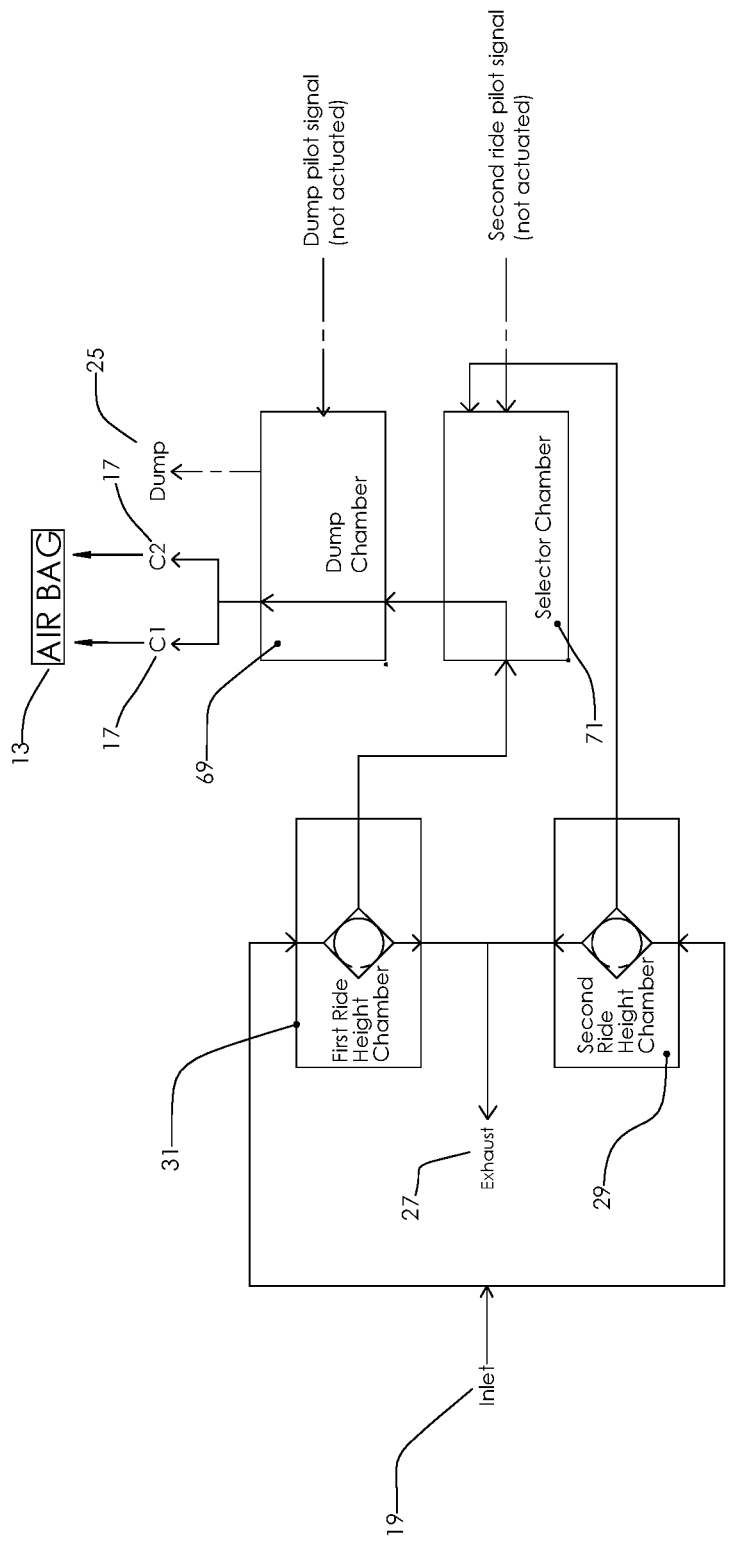
FIG. 11 is a flow diagram showing air flow during a first ride height configuration.

FIG. 11 diagrams the air flow for the default modes A1, B1, and C1. In these modes, the valve operates to dynamically maintain the ride height at the default level. As shown in the diagram the air flows into the ride height chambers 29 and 31 from the inlet 19. The selector chamber 71 is connected with first ride height chamber 31. So air flows thru inlet 19 to the first ride height chamber 31 to selector chamber 71 to dump chamber 69 to air bag ports 17 out to air bags 13. During dynamic exhaust, air flows through the same pathway in reverse but out the exhaust port 27.

Figure 12A:
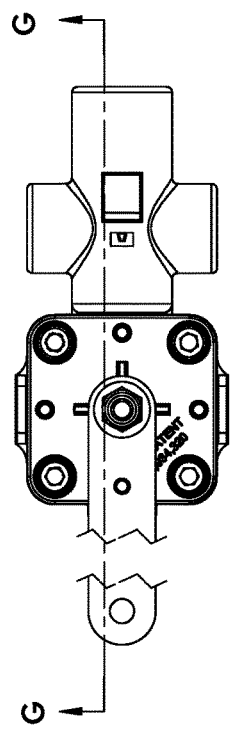
FIG. 12A is a top view of the configurable valve.
Figure 12B:
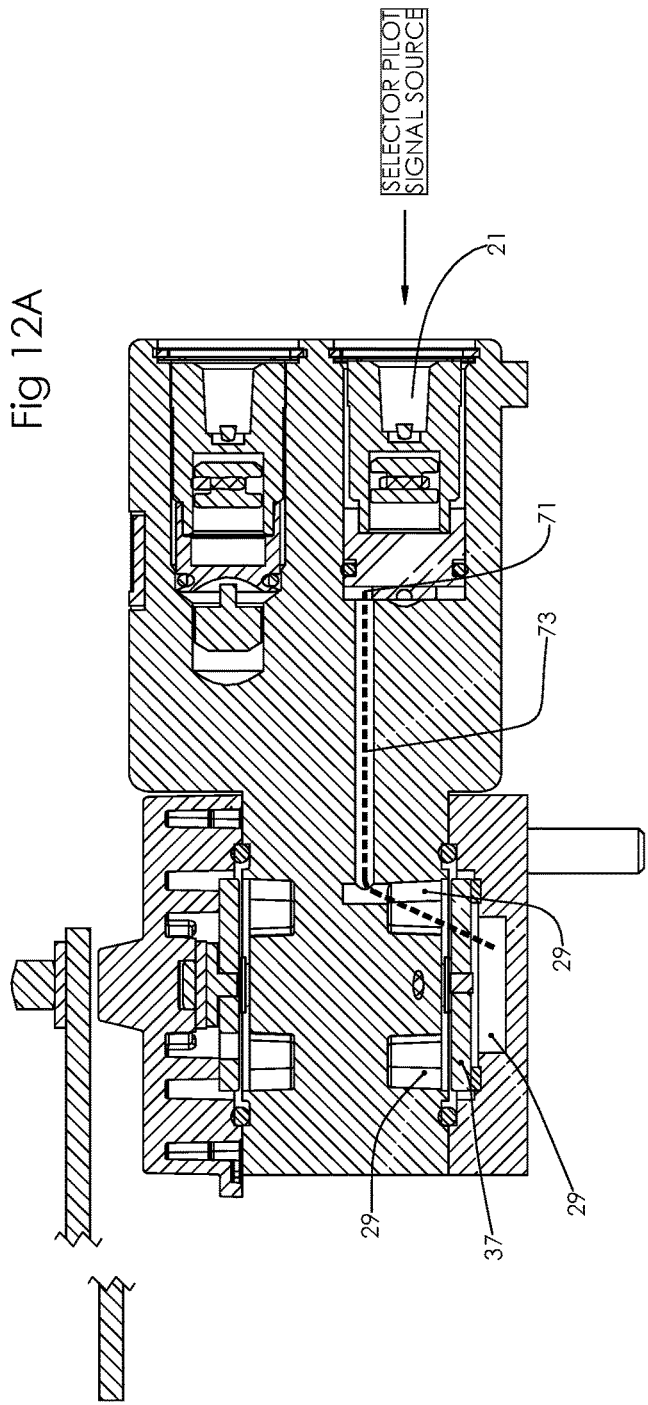
FIG. 12B is a side cross-section view G-G of FIG. 12A partially showing air flow during dynamic leveling to maintain an operated selected second ride height mode.
Figure 12E:
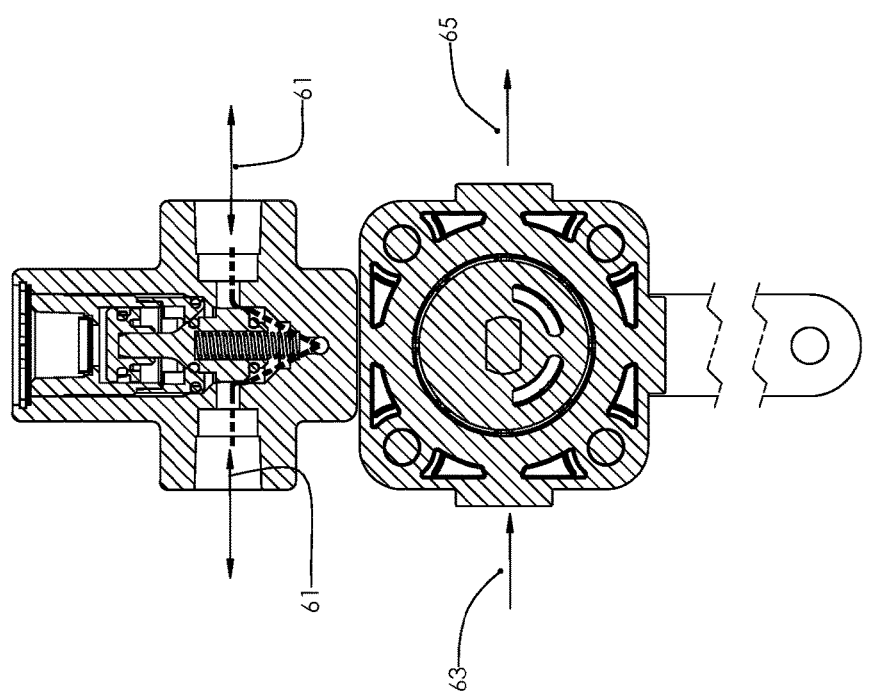
FIG. 12E is a top cross section view E-E of FIG. 3B showing further details of air flow during a second ride height configuration.

Similarly to FIGS. 10A-10E detailed air flow during second ride height is shown in FIGS. 12A-12F. FIGS. 12A-12F depict air flow during dynamic leveling for the selected second ride height in operation modes A2 and B2. FIG. 12A is a top view of the configurable control valve 3. FIG. 12 B is a cross-sectional view G-G taken from FIG. 12A. FIG. 12 C is front view of the configurable control valve 3. FIG. 12D is cross-section H-H taken from FIG. 12C. FIG. 12F is the detail view L taken from FIG. 12D. FIG. 12E is a cross-sectional view E-E taken from FIG. 3B.

As shown in FIG. 12B, when a pilot signal is applied to the selector pilot port 21, the second ride height mode is actuated. During dynamic leveling at the second ride height, the air inlet flow 63 (FIG. 12E) into the inlet port 19 and to the second ride chamber 29 (FIG. 12B). When the apertures of lower rotor valve 37 and orifice 58 of lower pressure seal 53 are aligned or overlapping, air then flows through the second ride height passage 73 to the back of the valve seat 43 and then through the valve seat orifice 84 (see FIG. 21 A) to the selector chamber 71, though the common transfer passage 74, into the dump chamber 69 which connects pneumatically to the air bags 13. During dynamic exhaust at the second ride height, when the valve lever 7 position indicates the ride height is too high, the rotated apertures in the rotor valve 37 align with the pressure seals 53 (see FIG. 5B) to allow a pneumatic connection between the air bags 13 and the exhaust port 27, such that air flows in the reverse direction out of the air bags 13 and exiting through the exhaust port 27. FIG. 12F shows a detail view L of the height change selector assembly 47 during second ride height or blocking operation. Air flow 44 passing through the valve seat 43 and past the ride height shuttle valve 41 is shown.

Figure 13:
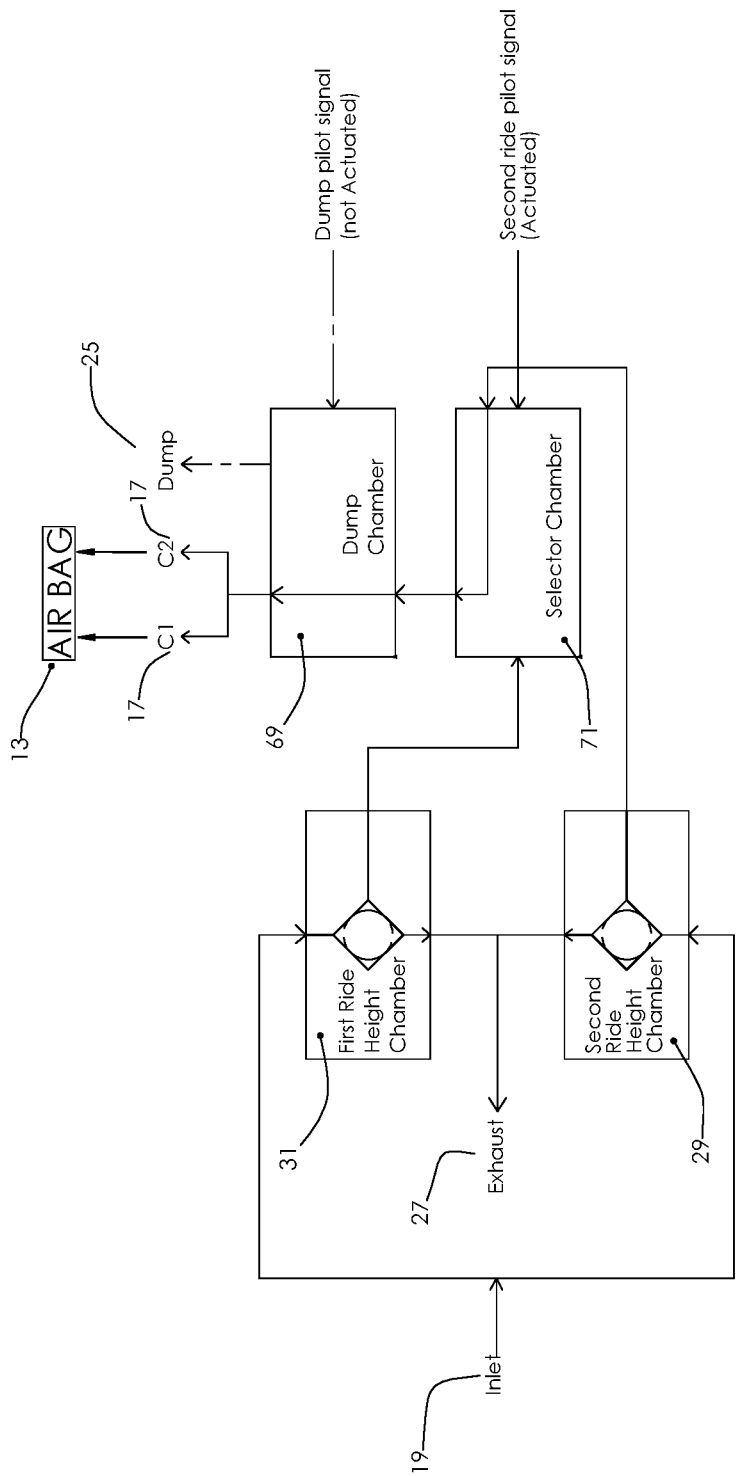
FIG. 13 is a flow diagram showing air flow during a second ride height configuration.
Figure 15D:
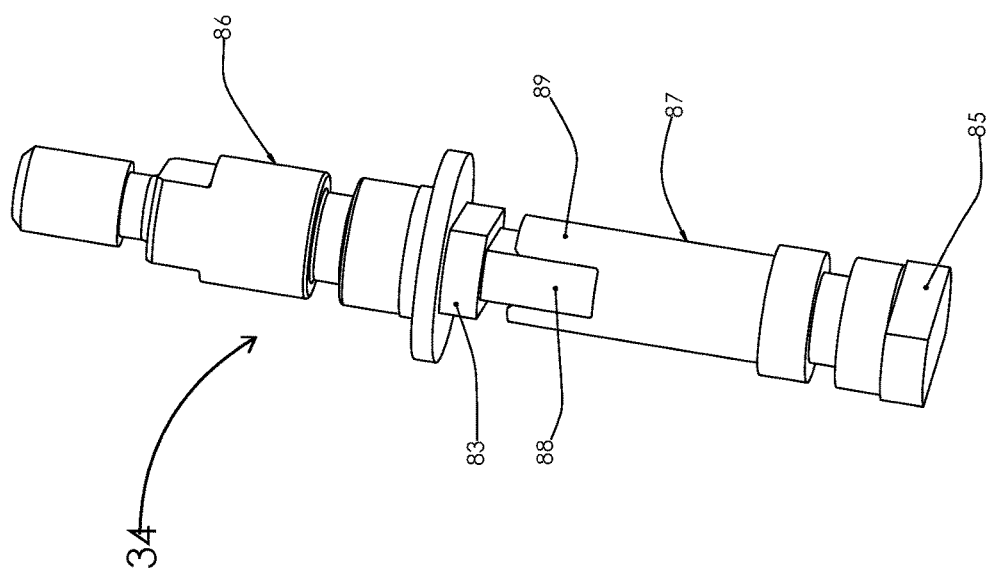
FIG. 15D shows an isometric view of the configurable valve shaft.

Similarly to FIG. 11, FIG. 13 diagrams the air flow during dynamic leveling for modes A2 and B2. In these modes, the valve operates to dynamically maintain the ride height at the second (elevated for mode A2 or lowered for mode B2) level. As shown in the diagram, during dynamic air bag inflation the air flows into the ride height chambers 29 and 31 from the inlet 19, The selector chamber 71 is connected with second ride height chamber 29. To activate this function (see FIG. 12), the selector pilot signal to the selector pilot port 21 has caused the right height shuttle valve 41 to move forward (to the left in FIG. 12D) against the biasing of spring 40. This opens a different pathway through the selector chamber 71. In the selector chamber 71, the shuttle valve's forward position selects a flow path from the second ride height chamber 29 to selector chamber 71 and directs it to the dump chamber 69 then out to the air bags 13. During dynamic exhaust, air flows through the same pathway in reverse but directed by the rotor valve apertures out the exhaust port 27.

The chart in FIG. 14 outlines configurations and modes of an exemplary embodiment of the valve and the functionality in each of the configurations and each of the operational modes. Each of these is described in more detail below. Refer to FIG. 14 for the configuration and mode descriptions here.

Mode A1: first ride height (referred to as the default or normal ride height): In this mode, the valve performs its primary function of maintaining the ride height H1 (a distance between the vehicle axle and chassis (also called the vehicle frame)) of the vehicle by letting the air in and out of the valve based on load and road conditions and actively maintains a calibrated vehicle original equipment manufacturer (OEM) set ride height, when vehicle is in motion as well as when vehicle is stationary.

Mode A2: second ride height (also referred to as over inflation or elevated mode)—upon activation of this mode by the operator, the valve directs air flow to the air bags which lift the chassis of the vehicle to height H2 with respect to the axle. This height is the fixed height provided by original equipment manufacturer (OEM) and factory set by valve manufacturer. In this mode, the operator sends an air pilot signal to second ride height selector port of the valve by pressing a switch on the vehicle dash board. The valve responds to the signal and switches from first to secondary ride height by disengaging the airflow from first ride height chamber and engaging the air flow from second ride height chamber. In second ride height chamber, the lower shaft key has an offset angle relative to the upper shaft key which is directly proportional to the difference between first and second ride height. This can also be achieved by keeping the same shaft and changing the offset angle on the lower rotor valve slot.

Mode A3: dump mode—upon activation of this mode by the operator, the valve dumps all the air from the vehicle air bags and brings the chassis down at height H3 with respect to the axle. This mode is only available and may only be actuated when vehicle is stationary. In this mode, the operator sends an air pilot signal to the dump pilot port of the valve. The valve responds to the signal and disengages the airflow from both first and second ride height chambers. So, now the flow of air is from vehicle air bags to the dump port of the valve through valve's bag ports. The valve is capable of achieving this from both the first and second ride height modes.

Mode B1: first ride height (default or normal): This mode is identical to mode A1. In this mode, the valve performs its primary function of maintaining the ride height H1 (distance between vehicle axle and chassis (frame)) of the vehicle by dynamically letting the air in and out of the valve based on load or road conditions and actively maintains vehicle OEM set ride height when vehicle is in motion as well as when vehicle is stationary.

Mode B2: second ride height (under inflation or lowered)—upon activation of this mode by the operator, the valve lowers the chassis of the vehicle to height H4 with respect to the axle. This height is the fixed height provided by the OEM and factory set by valve manufacturer. In this mode, the operator sends an air pilot signal to second ride height selector port of the valve. The valve responds to the signal and switches from first to secondary ride height by disengaging the airflow from first ride height chamber and engaging the air flow to second ride height chamber. In second ride height chamber, the phasing shaft has an offset angle (opposite to mode A2) relative to the first shaft which is directly proportional to the angular offset between first and second ride height. This can also be achieved by keeping the same shaft and changing the offset angle on the rotor valve. This mode is similar to mode A2 with an exception that in mode A2 the valve lifts the chassis whereas in mode B2 the valve lowers the chassis relative to the axle.

Mode B3: dump mode this mode is identical to mode A3. Upon activation of this mode by driver, the valve quickly dumps all the air from the vehicle air bags and brings the chassis down to height H3 with respect to the axle. This mode is only available and may only be actuated when vehicle is stationary. In this mode, the operator sends an air pilot signal to the dump pilot port of the valve. The valve responds to the signal and disengages the airflow from both first and second ride height chambers. The flow of air is from vehicle air bags to the dump port of the valve. The valve is capable of achieving this from both first and second ride height mode.

Mode C1: first ride height (default): This mode is identical to modes A1 and B1. In this mode, the valve performs its primary function of maintaining the ride height H1 (distance between vehicle axle and chassis (frame)) of the vehicle by letting the air in and out of the air bags through the valve based on load and road conditions and actively maintains OEM set ride height when vehicle is in motion as well as when vehicle is stationary.

Mode C2: blocking mode: upon activation of this mode by the operator, the valve maintains air pressure in the air bags by blocking the air going in and out of the air bag. In this mode, the driver sends an air pilot signal to the second ride height selector port of the valve. The valve responds to the signal, disengages the airflow from first ride height chamber and connects to second chamber which is by default blocked by factory settings. Hence there is no airflow going in and out of the valve. The blocking mode can achieved in at least five different ways: a) no aperture in the lower rotor valve; b) no hole in pressure seals which abut the rotor valves; c) no air passage through the valve body to pass the second ride air flow; d) blocking the flow in the second ride height port with a steel ball, or e) no air passage through the shuttle valve seat 43.

Mode C3: dump mode: This mode is identical to modes A3 and B3. Upon activation of this mode by the operator, the valve dumps all the air from the vehicle air bags directly to the dump port, and brings the chassis down to height H3 with respect to the axle. This mode is only available and may only be actuated when vehicle is stationary. In this mode, the operator sends an air pilot signal to the dump pilot port of the valve. The valve responds to the signal and disengages the airflow from both first and second ride height chambers. The flow of air is from vehicle air bags to the dump port of the valve. The valve is capable of achieving this from both first and second ride height mode.

In FIGS. 15A-15D and FIGS. 16A-16C, various embodiments for methods for performing dual ride height functionality are shown. Each of the embodiments results in angularly displaced (angular offset) or phase shifted apertures in the rotor valve, either by modifications of the rotor valve shaft assembly, or by modifications of the rotor valves themselves.

In various embodiments secondary ride heights can be achieved by creating an angular offset between the upper and lower rotor valve aperture angular positions. All of the embodiments accomplishing this function utilize various means for keying, or precisely angularly fixing the angular position of the two sets of phase shifted rotor valve apertures relative to the shaft and valve lever, which is also keyed to the shaft assembly. Among other embodiment implementations, this may be accomplished by modifying the angular connection between rotor slot and shaft key. FIGS. 15A-15D and 16A-16C show exemplary embodiments for implementing a configurable duplex rotor valve with different rotor valve aperture angular offsets.

In FIG. 15A-15D an embodiment implementation method utilizing angular offset between keyed upper shaft portion 86 and keyed lower shaft portion 87 is shown. In this embodiment, the lower shaft portion 87 is modified by changing the angular offset 75 between the shaft groove 89 and lower shaft key 85 which results in the angular offset between lower shaft key 85 and upper shaft key 83. In other embodiments which utilize a single shaft component, the angular offset between the upper shaft key 83 and the lower shaft key 85 may be machined directly.

In the embodiment shown in FIGS. 15A and 15B, however, the modular design of the shaft and simple machining of the lower shaft portion 87 provide a simple and low cost means for modifying first and second ride heights according to customer requirements. Indeed, a variety of pre-configured machined lower shaft components may be stocked while keeping inventory costs low. The modular implementation of the configurable shaft has a variety of benefits to the manufacturer, including reduced component costs and lead times for application specific valves, and reduced manufacturer inventory requirements to meet any valve replacement demands.

FIG. 15C shows top views of the upper rotor valve 35 and lower rotor valve 37 and between them a side view of the shaft assembly 33. In order to more clearly illustrate the operative nature of the duplex rotor valve system, this FIG. 15C is an exemplar snapshot showing the orientation of relevant valve components. At the top of FIG. 15C, a top view of the upper rotor valve 35 is shown including the angular position of the rotor valve apertures 77 relative to the upper pressure seals 54. In the shown rotational position, the upper rotor valve is sealed against the upper pressure seals.

In contrast, the bottom portion of FIG. 15C shows a top view of the lower rotor valve 37, including the lower rotor valve apertures 55 and the lower pressure seals 53. In the shown rotational position, the rotor valve aperture and pressure seal aperture are aligned, which would allow air flow between the operative chambers.

In the center portion of FIG. 15C a side view of the shaft assembly, including the rotor valves, and pressure seals is shown. Hence, when the lower rotor valve 37 is affixed onto lower shaft portion 87 with mating slot and key sections, it creates an offset angle between the primary and secondary ride height proportional to the angular offset of the lower apertures 55 and the upper apertures 77. This angular offset is proportional to the difference between the first and second ride heights.

In FIGS. 16A-16C an embodiment is shown utilizing an angular offset between the rotor valve center slot angles. In this embodiment, both the upper shaft key portion 83 and the lower shaft key portion 85 (FIGS. 15A-B) remains unchanged. In other words they are parallel to each other or at the similar angular offset. Hence the angular offset between two rotor apertures is achieved by creating angular offset between upper rotor valve slot 93 and lower rotor valve slot 95. This is accomplished by creating the lower rotor slot at angle 75 (of X degrees). Hence, when the rotors are mounted or fixed to the shaft, an offset angle is created for determining primary and secondary ride height ranges. This angular offset implements an angular difference for when the valve lever position creates a pneumatic connection through the rotor apertures 55 and 77. The angular offset is proportional to the offset between the first and second ride heights. FIG. 16C illustrates the corresponding aspects of this embodiment for comparison with the embodiment in FIG. 15C.

Figure 17A:
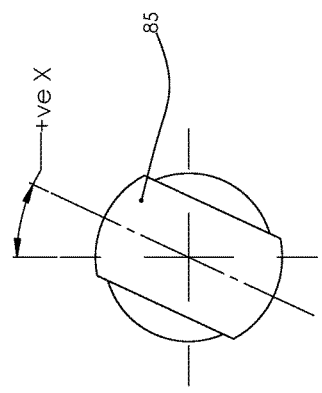
FIGS. 17A-17B are top views of showing the lower shaft 87 shown highlighting phase angle 75 selection by modifying the lower shaft key portion 85. As shown +ve angle and −ve angle is used to either raise or lower depending upon the direction the Valve is mounted on the truck.
Figure 17B:
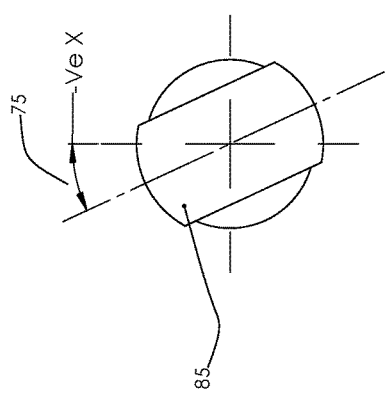
Figure 17C:
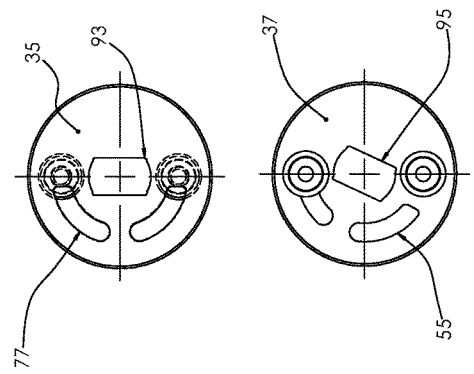
FIGS. 17C and 17D show top view of the rotor valves and (either visible or hidden) pressure seals which demonstrate the phase differential operation between the two rotor valves.
Figure 17D:
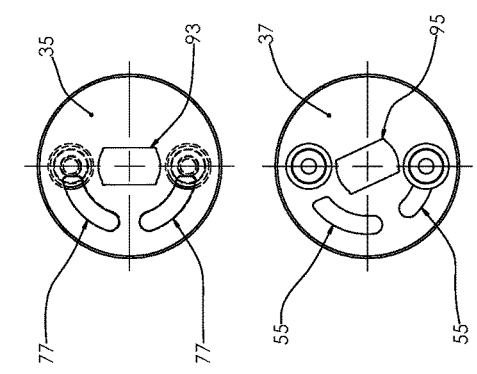

In FIGS. 17A and 17B, angular offsets differences are shown for raised (over inflation) ride level (FIG. 17A) and a lowered (under-inflation) (FIG. 17B) configurations of the valve embodiment showing the modified shaft key angle as +ve X or –ve X. FIGS. 17C and 17D show the corresponding upper and lower rotor valves in their angular relationship. FIG. 17C corresponds to the shaft configuration in FIG. 17A, and FIG. 17D corresponds to the shaft configuration in FIG. 17B.

In FIGS. 18A and 18B cross sections are show to illustrate air flow during the dump mode. FIG. 18A is a top view of the valve embodiment. When the dump mode is actuated by applying pneumatic pilot pressure to the dump pilot port 23 a direct flow path (pneumatic connection) is created from the air bag ports 17 to the dump port 25. The flow between the air bag ports 17 and the dump port 25 is shown as dump flow paths 79 and 81. Therefore, it can be understood that the dump pilot signal has caused the dump shuttle valve 48 to move into the spring biased position (to the left in the figures) thereby presenting a flow path from the air bags 13 directly to the dump port 25. The flow through dump port 25 is strong enough to lift the flap 92.

Figure 19:
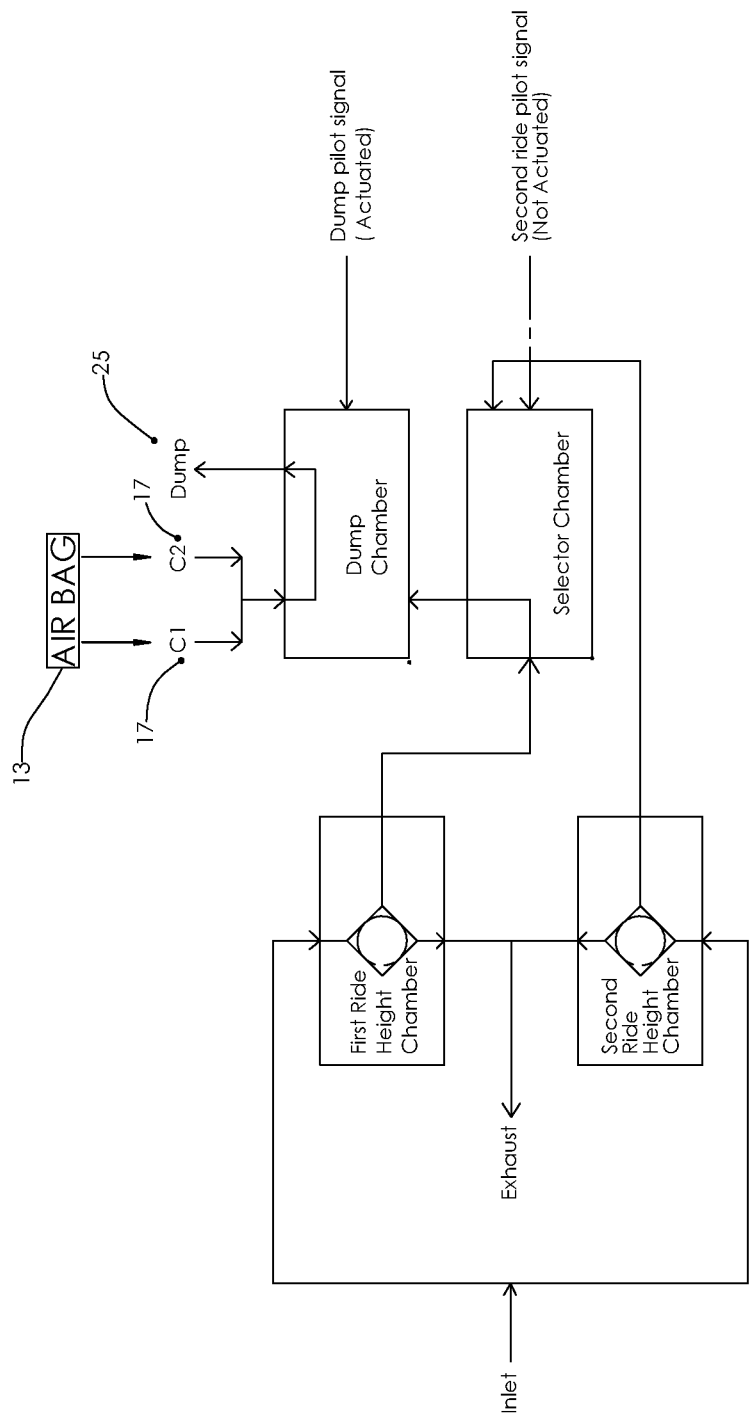
FIG. 19 is a flow diagram showing air flow during dump operation while an embodiment of a valve is operating in normal or first ride height operation.

In FIG. 19 the flow diagram for the dump mode is shown for an embodiment of a configurable valve operating in the first ride height operating mode. In this mode, air flow only happens directly between the air bags 13 and the dump port 25 shown as dump).

Figure 20:
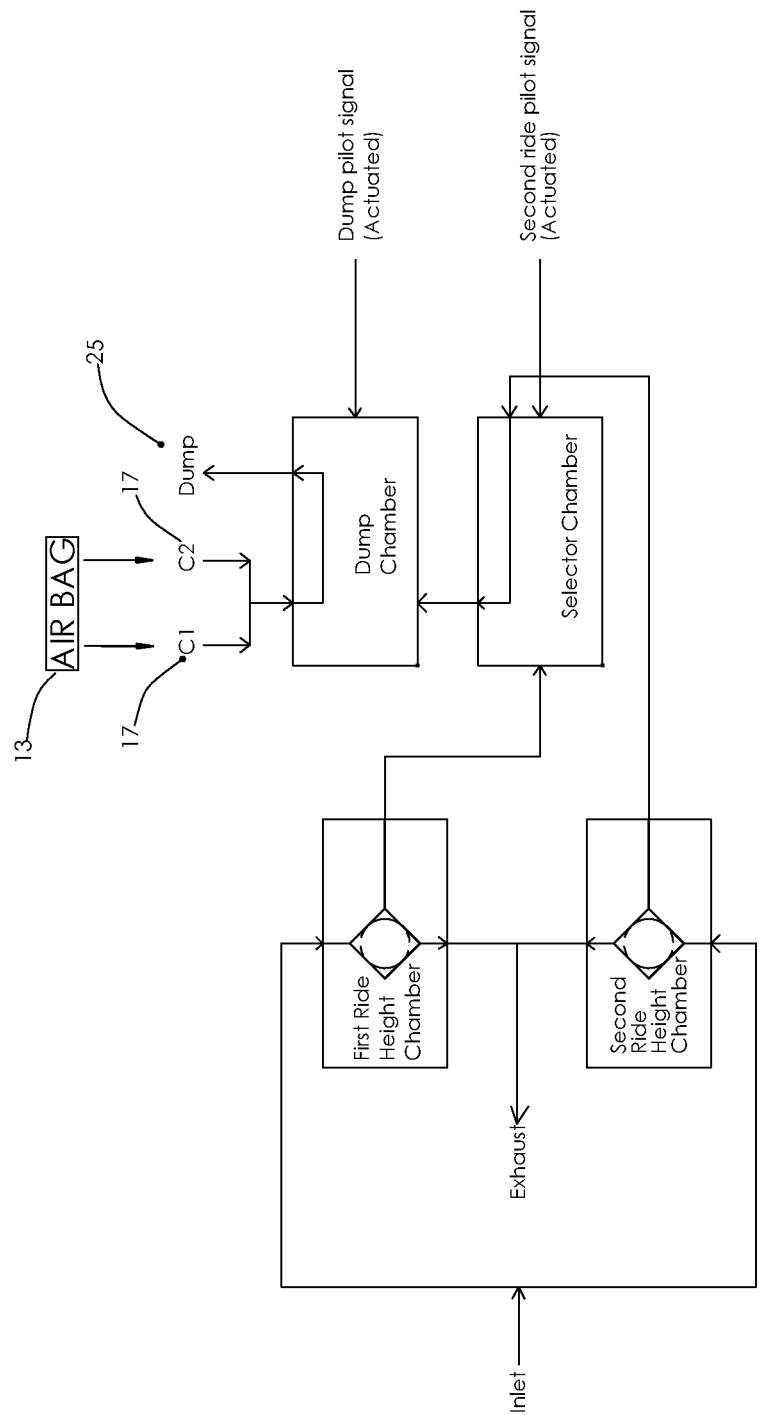
FIG. 20 is a flow diagram showing air flow during dump operation while an embodiment of a valve is operating in second ride height operation.

In FIG. 20 the flow diagram for the dump mode is shown for an embodiment of a configurable valve operating in the second ride height operating mode. In this mode, air flow only happens directly between the air bags 13 and the dump port 25 (shown as dump). It is an advantage of these embodiments of the invention to utilize a common pilot and chamber system for both operating a dump mode from either ride height mode or from the blocking mode.

Figure 21B:
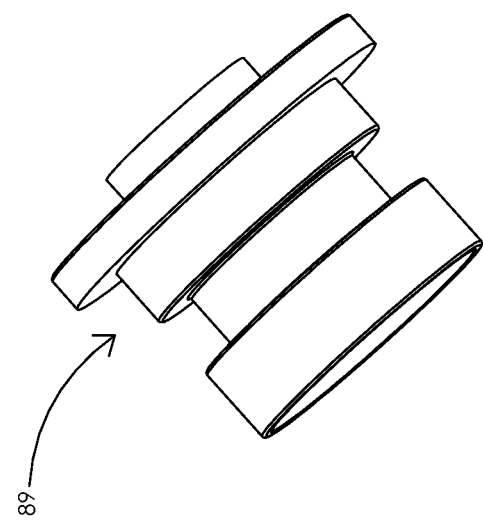
FIG. 21B is a valve seat for an embodiment showing the blocked porting which blocks air flow for a valve to operate in blocking mode while the valve is otherwise controlled to operate in the first/default ride height mode.
Figure 21A:
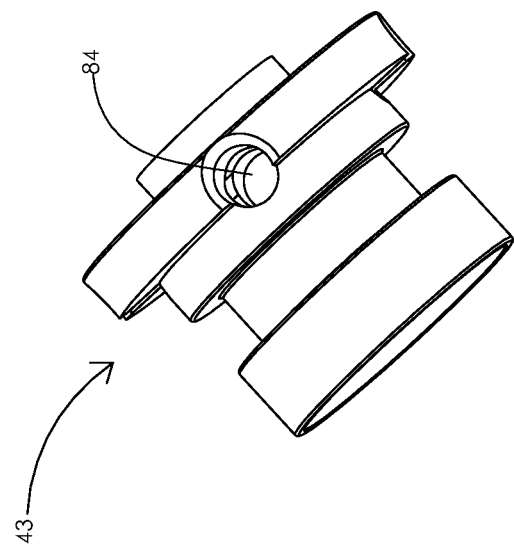
FIG. 21A is a valve seat for an embodiment showing the porting which allows air flow to operate in second ride height mode.

In FIGS. 21A and 21B, two configurations for a valve seat are shown. In FIG. 21A, a seat 43 is shown including orifice 84 which allows air flow for performing the second ride height functionality 87. In FIG. 21B, valve seat 89 is shown configured to block air flow as it contains no orifice for allowing second ride height. Thus when configured with valve seat 89, selection of the second ride height mode performs the blocking function.

In various embodiments, the pilot switching functions for the second ride height, blocking and dump modes may be performed by hydraulic systems. In various embodiments, the pilot switching functions may be performed by electrical activation of solenoids controlling the shuttle valve or quick exhaust valve.

As can be understood from the foregoing detailed description there is disclosed a configurable valve in which various options for settings and operation can be implemented with nearly all of the valve construction being in common among those various options. In fact at one level of operation only the angular offset of the secondary rotor valve to the prime rotor valve requires a specially made part. At that level of implementation the only change in structure is to provide an offset angle between the prime rotor valve and the secondary rotor valve. The amount of offset is selected to provide a result that a customer will specify for the second ride height. That result is to allow a default setting (first ride height) as in configuration modes A1, B1 and. C1 and which is solely the function of the upper rotor valve in creating an air path from the pressurized air source to the air bags. The first level then allows a second setting called second ride height. That second setting is the result of the amount and direction of angular offset which can be either under inflation or over inflation depending on whether the angular offset is in the positive or negative direction. To implement that second ride height called A2 and B2 (configuration C does not provide a second ride height) a pilot signal is given by the operator causing repositioning of the primary shuttle from its default position to its secondary position. That repositioning closes the air pathway from the prime rotor valve (the upper rotor valve) for the default setting (which keeps it available) and opens the air pathway from the secondary rotor valve past the primary shuttle. All of this is implemented in the common structure by just installing the secondary rotor valve at a selected offset to the upper rotor valve. As seen above this can be very simply done by making the lower shaft portion with its key 85 made at the necessary angle to mount the secondary rotor valve at the desired offset to the upper rotor valve.

A second level of operation is made available by a second simple adjustment within the common structure and requiring no additional changes other than what has been done for the first level. That second level is to make available the dump modes A3, B3, C3. This is done by the dump assembly 45 being operated by the pilot signal to move the dump shuttle into its biased position (to the left in the figures. This has two results. One is to block the common transfer passage which therefore disengages any operation from the duplex rotor seal assembly whether it is default height selection or the secondary height selection. The other result is opening the passage way 79 directly from the air bags 13 to the dump port 25 thereby actuating the dump function.

There is also a level of operation that is specified for some vocational vehicles in which the chassis is lifted but no adjustment of the air bags happens, this is mode C2. This is done by the operator sending the pilot signal to the shuttle 41 which would normally allow a second ride height, but with the passage from the secondary rotor valve to the common passage 74 now blocked by absence of the orifice 84. As discussed above there are several other means for blocking that air passage for the same effect, The air bags do not inflate or deflate in blocking mode.

It will be understood that the particular embodiments described in detail herein are illustrative of the invention and that many other embodiments are applicable. The principal features highlighted herein may be employed in many embodiments within the scope of the claim.

The invention claimed is:

1. A valve for a leveling control system, the valve comprising:
   an inlet port (19);
   an exhaust port (27)
   a first ride height chamber (31) fluidically coupled to receive a fluidic input from the inlet port (19) and to provide a fluidic output to the exhaust port (27);
   a second ride height chamber (29) fluidicalty coupled to receive a fluidic input from the inlet port (19) and to provide a fluidic output to the exhaust port (27);
   a dump chamber (69);
   a selector chamber (71), wherein the selector chamber (71) selectively fluidically couples the first ride height chamber (31) or the second ride height chamber (29) to the dump chamber (69);
   a selector assembly (47) coupled to the selector chamber (71), wherein the selector assembly controls the selector chamber (71) to selectively couple the first ride height chamber (31) or the second ride height chamber (29) to the dump chamber (69).
   one or more bi-directional ports (17) fluidically coupled to the dump chamber (69);
   a lever (7) coupled to a valve shaft (34);
   a first rotor valve (35) mechanically coupled to the valve shaft (34), wherein the first rotor valve (35) comprises one or more first rotor valve apertures (77), wherein the one or more first rotor valve apertures (77) control fluid flow through the first ride height chamber (31) based on a position of the lever (7); and
      a second rotor valve (37) mechanically coupled to the valve shaft (34), wherein the second rotor valve (37) comprises a replaceable component with selectable component configurations, and a first selectable configuration comprises a configuration that blocks air flow through the second ride height chamber (29) for all angular positions of the lever (7) and coupled valve shaft (43).

2. The valve according to claim 1, wherein the one or more first rotor valve apertures (77) are configured to control fluid flow through the first ride height chamber (31) at a default ride height.

3. The valve according to claim 2, wherein the second rotor valve (37) comprises one or more second rotor valve apertures (55) and a second selectable configuration comprises the one or more second rotor valve apertures (55) configured to control fluid flow through the second ride height chamber (29) at a second ride height different than the default ride height.

4. The valve according to claim 3, wherein a third selectable configuration comprises the one or more second rotor valve apertures (55) configured to control fluid flow through the second ride height chamber (29) at a third ride height different than the default ride height and wherein the second ride height comprises a height higher than the default ride height and the third ride height comprises a height lower than the default ride height.

5. The valve according to claims 1, further comprising
   a dump port (25); and
   a dump chamber control (23) coupled to the dump chamber (69), wherein the dump chamber control (23) selectively fluidically couples the one or more bi-directional ports (17) to the dump port (25) through the dump chamber (69).

6. The valve according to claim 1, wherein the inlet port (19) is coupled to a compressed air source and fluidic coupling comprises pneumatic coupling.

7. The valve according to claim 6, wherein the one or more bidirectional ports (17) are coupled to one or more air bags.

8. The valve according to claim 7, wherein the selector assembly (47) comprises a pneumatically controlled port.

9. The valve according to claim 8, wherein further comprising:
   a dump port (25); and
   a dump pilot port (23) pneumatically coupled to the dump chamber (69), wherein the dump pilot port (23) selectively pneumatically couples the one or more air bags to the dump port (25), whereby the air bags are emptied of air upon selective control of the dump pilot port (23).

10. The valve according to claim 9, wherein the dump port comprises a flap (92) of an elastomeric material.

11. A leveling system comprising:
   a lever (1) coupled to a first structure (11), wherein the lever (1) has an angular position based on a height difference between the first structure (11) and a second structure (5);
   one or more air bags (13) disposed between the first structure (11) and the second structure (5);
   a dump chamber (69) pneumatically coupled to the one or more air bags (13);
   a first ride height chamber (31) configured to receive air from a compressed air source at an input port (19) and to exhaust air at an exhaust port (27);
   a second ride height chamber (29) configured to receive air from the compressed air source at the input port (19) and to exhaust air at the exhaust port (27);
   a selector chamber (71), wherein the selector chamber (71) selectively directs air between the dump chamber (69) and the first ride height chamber (31) or the dump chamber (69) and the second ride height chamber (29);
   a selector assembly (47) coupled to the selector chamber (71), wherein the selector assembly controls the selector chamber (71) to select air direction between the dump chamber (69) and the first ride height chamber (31) or the dump chamber (69) and the second ride height chamber (29);
   wherein air flow in the first ride height chamber (31) is controlled based on the angular position of the lever (1) when the selector assembly (47) selects air direction between the dump chamber (69) and the first ride height chamber (31); and wherein the second ride height chamber (29) comprises a configurable air control assembly for controlling air flow in the second ride height chamber (29) that is operative when the selector assembly (47) selects air direction between the dump chamber (69) and the second ride height chamber (29), the configurable air control assembly having a first configuration that blocks all air flow in the second ride height chamber (29) for all angular positions of the lever (7) and coupled valve shaft (43), and a second configuration that controls air flow in the second ride height chamber (29) based on the angular position of the lever (1).

12. The system according to claim 11, wherein a default height difference is achieved when the selector assembly (47) selects air direction between the dump chamber (69) and the first ride height chamber (31) and a second height difference different than the default height difference is achieved when the configurable air control assembly has the second configuration and selector assembly (47) selects air direction between the dump chamber (69) and the second ride height chamber (29).

13. The system according to claim 12, wherein the configurable air control assembly has a third configuration that provides a third height difference when the selector assembly (47) selects air direction between the dump chamber (69) and the second ride height chamber (29), wherein the second height difference is larger than the default height difference and the third height difference is smaller than the default height difference.

14. The system according to claim 11, further comprising a dump chamber control (23), wherein the dump chamber control (23) selectively controls the dump chamber (69) to empty air from the one or more air bags (1) to a dump port (25).

15. The system according to claim 14, wherein the dump chamber control (23) comprises a second pneumatically controlled assembly.

16. The system according to claim 11, wherein the selector assembly (47) comprises a first pneumatically controlled assembly.

17. The system according to claim 16, wherein the first pneumatically controlled assembly is configured for operation by an operator located in a vehicle cab.

18. The system according to claim 11, wherein the first structure comprises a vehicle axle and the second structure comprises a vehicle chassis.

19. The system according to claim 11, wherein the dump chamber (69), the first ride height chamber (31), the second ride height chamber (29), the selector chamber (71), and the selector assembly (47) are contained within a valve body (4).

20. The system according to claim 11, wherein the first ride height chamber (31) comprises a first rotor valve mechanically coupled to the lever (91), and the first rotor valve comprises one or more apertures configured to control air flow.

* * * * *